(12) United States Patent
Hayashi et al.

(10) Patent No.: US 12,576,500 B2
(45) Date of Patent: Mar. 17, 2026

(54) ELECTRIC POWER TOOL, AND METHOD FOR CONTROLLING MOTOR IN ELECTRIC POWER TOOL

(71) Applicant: MAKITA CORPORATION, Anjo (JP)

(72) Inventors: Yuki Hayashi, Anjo (JP); Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 237 days.

(21) Appl. No.: 18/379,900

(22) Filed: Oct. 13, 2023

(65) Prior Publication Data

US 2024/0123594 A1    Apr. 18, 2024

(30) Foreign Application Priority Data

Oct. 18, 2022    (JP) ................................. 2022-166856

(51) Int. Cl.
*H02P 1/26*        (2006.01)
*B25F 5/00*        (2006.01)
*H02P 6/08*        (2016.01)

(52) U.S. Cl.
CPC ................ *B25F 5/001* (2013.01); *H02P 6/08* (2013.01)

(58) Field of Classification Search
CPC ............... H02P 7/29; H02P 6/08; H02P 27/08
See application file for complete search history.

(56) References Cited

U.S. PATENT DOCUMENTS

| | | | |
|---|---|---|---|
| 2011/0284256 A1 | 11/2011 | Iwata | |
| 2013/0049643 A1* | 2/2013 | Kusakawa | B25B 21/00 |
| | | | 318/9 |
| 2021/0060755 A1* | 3/2021 | Kawai | B25F 5/00 |

FOREIGN PATENT DOCUMENTS

| | | | | |
|---|---|---|---|---|
| EP | 0374959 A2 * | 6/1990 | | H01H 3/46 |
| EP | 2442439 A2 * | 4/2012 | | A01D 69/02 |
| JP | 2011-240441 A | 12/2011 | | |

* cited by examiner

*Primary Examiner* — Karen Masih
(74) *Attorney, Agent, or Firm* — OLIFF PLC.

(57) ABSTRACT

One aspect of the present disclosure provides an electric power tool including a motor, a drive circuit, a voltage detector, a first calculator, and a second calculator. The drive circuit applies a power-supply voltage to the motor in accordance with a first duty ratio. The voltage detector detects a magnitude of the power-supply voltage. The first calculator calculates a desired duty ratio based on the magnitude of the power-supply voltage detected. The second calculator increases the first duty ratio from an initial value to the desired duty ratio in accordance with a lapse of time. The second calculator varies a rate of increase of the first duty ratio based on the magnitude of the power-supply voltage detected.

20 Claims, 12 Drawing Sheets

UPWARD

REARWARD ←——→ FORWARD

DOWNWARD

DS: FIRST DUTY RATIO
Dp1: FIRST PRESCRIBED DUTY RATIO
Pi1: FIRST RATE OF INCREASE
Pi3: THIRD RATE OF INCREASE

Dd: DESIRED DUTY RATIO
Dp2: SECOND PRESCRIBED DUTY RATIO
Pi2: SECOND RATE OF INCREASE

Dd : DESIRED DUTY RATIO

Tp2 : SECOND PRESCRIBED TIME PERIOD
Pi2 : SECOND RATE OF INCREASE

DS : FIRST DUTY RATIO
TE : INITIAL DRIVE TIME PERIOD
Tp1 : FIRST PRESCRIBED TIME PERIOD
Pi1 : FIRST RATE OF INCREASE
Pi3 : THIRD RATE OF INCREASE

ELECTRIC POWER TOOL, AND METHOD FOR CONTROLLING MOTOR IN ELECTRIC POWER TOOL

CROSS-REFERENCE TO RELATED APPLICATIONS

The present application claims the benefit of Japanese Patent Application No. 2022-166856 filed on Oct. 18, 2022 with the Japan Patent Office, the entire disclosure of which is incorporated herein by reference.

BACKGROUND

The present disclosure relates to techniques for controlling a motor in an electric power tool.

Japanese Unexamined Patent Application Publication No. 2011-240441 discloses an electric power tool configured to perform soft start control. In this electric power tool, a power-supply voltage is applied to a motor in accordance with a PWM drive signal to thereby drive the motor. The soft start control includes gradually increasing a duty ratio of the PWM drive signal from 0% to a desired value when the motor is started. The power-supply voltage is supplied from a battery.

SUMMARY

A magnitude of the power-supply voltage when the motor is started can vary due to a remaining energy of the battery and other causes. Variation in the magnitude of the power-supply voltage when motor drive is started may affect an acceleration (or a degree of acceleration) of the motor after driven. For example, a rotational speed of the motor after a given length of time has passed since the motor is started may vary in accordance with the magnitude of the power-supply voltage.

Variation in the acceleration of the motor may have undesirable effects on an operation result of the electric power tool. For example, in an operation of tightening a screw to a fastened material, variation in a tightening torque may occur due to the magnitude of the power-supply voltage.

In one aspect of the present disclosure, it is desirable that variation in the acceleration of the motor from when the motor is started, due to the magnitude of the power-supply voltage, can be reduced.

One aspect of the present disclosure provides an electric power tool including a motor, a drive circuit, a voltage detector, a first calculator, and a second calculator.

The drive circuit is configured to receive a power-supply voltage and a drive signal. The drive signal is in the form of a pulse-width modulation signal having a first duty ratio. The drive circuit is configured to apply the power-supply voltage to the motor in accordance with the first duty ratio to thereby drive the motor.

The voltage detector is configured to detect a magnitude of the power-supply voltage.

The first calculator is configured to calculate a desired duty ratio based on the magnitude of the power-supply voltage detected by the voltage detector. The desired duty ratio may be a desired value of the first duty ratio for rotating the motor at a specific desired rotational speed.

The second calculator is configured to calculate the first duty ratio. The second calculator is configured to increase the first duty ratio from an initial value to the desired duty ratio in accordance with a lapse of time. The second calculator is configured to vary a rate of increase of the first duty ratio based on the magnitude of the power-supply voltage detected by the voltage detector.

The electric power tool as above can reduce variation in a degree of acceleration of the motor due to the magnitude of the power-supply voltage.

Another aspect of the present disclosure provides an electric power tool including the above-described motor, the above-described drive circuit, the above-described voltage detector, the above-described first calculator, and a second calculator. The second calculator is configured to increase the first duty ratio from a specific initial value to the desired duty ratio along a first profile to thereby cause a rotational speed of the motor to reach the specific desired rotational speed along a first speed trajectory. The first profile is based on the magnitude of the power-supply voltage detected by the voltage detector.

The electric power tool as above can also reduce variation in the degree of acceleration of the rotational speed of the motor due to the magnitude of the power-supply voltage.

Yet another aspect of the present disclosure provides a method for controlling a motor in an electric power tool, the method comprising:

calculating a desired value of a duty ratio based on a magnitude of a power-supply voltage, the desired value being required to rotate the motor at a specific desired rotational speed;

increasing the duty ratio from a specific initial value to the desired value in accordance with a lapse of time;

varying a rate of increase of the duty ratio based on the magnitude of the power-supply voltage; and applying the power-supply voltage to the motor in accordance with the duty ratio to thereby drive the motor.

The method as above can reduce variation in the degree of acceleration of the rotational speed of the motor due to the magnitude of the power-supply voltage.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Overview of Embodiments

Figure 1:
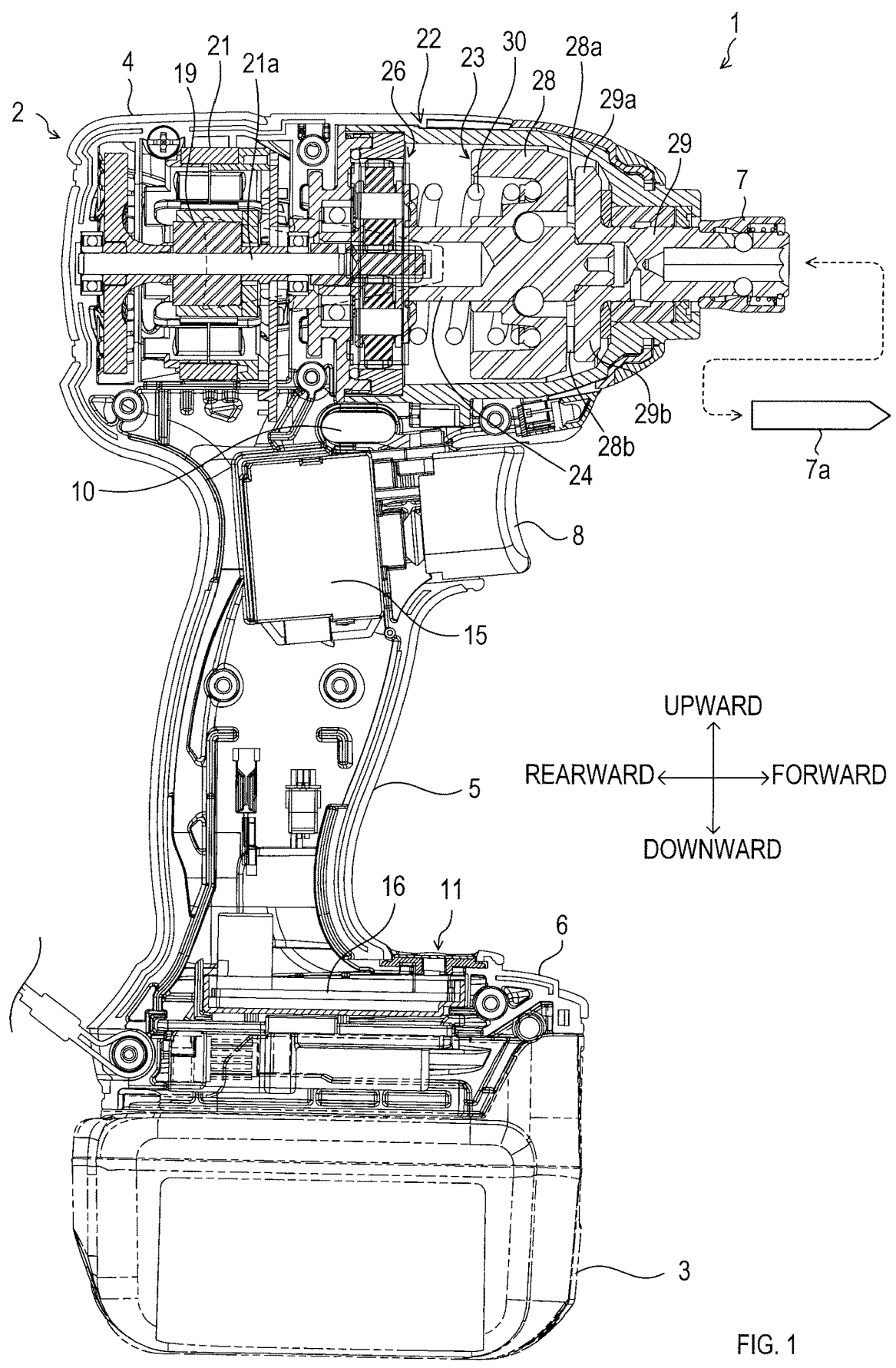
FIG. 1 is a side cross section of an electric power tool of a first embodiment.

One embodiment may provide an electric power tool including at least any one of:

Feature 1: a motor;

Feature 2: a drive circuit configured to receive a power-supply voltage and a drive signal;

Feature 3: the drive signal is in the form of a pulse-width modulation signal having a first duty ratio (or a setting duty ratio);

Feature 4: the drive circuit is configured to apply the power-supply voltage to the motor in accordance with the first duty ratio to thereby drive the motor;

Feature 5: a voltage detector (or a voltage detection circuit) configured to detect a magnitude of the power-supply voltage;

Feature 6: a first calculator (or a first calculation circuit, or a target calculator) configured to calculate a desired duty ratio (or a target duty ratio) based on the magnitude of the power-supply voltage detected by the voltage detector;

Feature 7: the desired duty ratio is a desired value (or a target value) of the first duty ratio for rotating the motor at a desired rotational speed (or a target rotational speed). The desired rotational speed may be determined in advance;

Feature 8: a second calculator (or a second calculation circuit, or a first duty ratio calculator, or a setting duty ratio calculator) configured to calculate the first duty ratio;

Feature 9: the second calculator is configured to increase the first duty ratio from an initial value to the desired duty ratio in accordance with a lapse of time (or gradually or continuously or stepwisely or along a first profile); and Feature 10: the second calculator is configured to vary (or change or determine) a rate of increase of the first duty ratio based on the magnitude of the power-supply voltage detected by the voltage detector.

The drive circuit may apply the power-supply voltage to the motor periodically.

Varying the rate of increase based on the magnitude of the power-supply voltage includes any forms that involve the magnitude of the power-supply voltage in calculation of the rate of increase.

Varying the rate of increase may include varying the rate of increase in accordance with a lapse of time. Specifically, for example, the rate of increase may be varied continuously or intermittently or along a specific profile.

In this case, the second calculator may vary (or change) (i) a degree of varying (or a process of varying) the rate of increase or (ii) the specific profile, in accordance with the magnitude of the power-supply voltage.

Also, for example, as described later, the second calculator may vary (for example, reduce) the rate of increase each time a specific timing arrives. The specific timing corresponds to a timing to vary the rate of increase. In this case, the specific timing may be changed in accordance with the magnitude of the power-supply voltage. The rate of increase may remain constant except for the specific timing. The degree of varying (or a rate of varying or an amount of varying) the rate of increase at the specific timing or the rate of increase after varied may vary in accordance with the magnitude of the power-supply voltage.

Varying the rate of increase may include calculating the rate of increase immediately after calculation of the first duty ratio is started (that is, the rate of increase from the initial value) in accordance with the magnitude of the power-supply voltage detected. For example, as described later, the rate of increase may be calculated so that the higher the power-supply voltage, the lower the rate of increase from the initial value.

The initial value may be determined in advance. The initial value may be 0% or may be greater than 0%.

The power-supply voltage may be, for example, in the form of a DC voltage.

The electric power tool may be configured so that a battery pack is detachably attached thereto. The power-supply voltage may be supplied from the battery pack. The battery pack includes a battery. The power-supply voltage may be a voltage of the battery.

The electric power tool may further include a grip, a trigger, a chuck sleeve and/or a drive command generator (or a drive command generation circuit). The grip is configured to be gripped by a user of the electric power tool. The trigger is configured to be manually moved (or manipulated) by the user. The chuck sleeve is configured to be driven by the motor. The chuck sleeve may be configured so that a tool bit is detachably attached thereto. The drive command generator is configured to output a drive command. The drive command includes the drive signal. The drive signal may have the first duty ratio calculated by the second calculator.

The electric power tool including at least features 1 through 10 can reduce variation in a degree of acceleration of the rotational speed of the motor (specifically for example, a degree of acceleration from when the motor is started) due to the magnitude of the power-supply voltage.

One embodiment may include, in addition to or in place of at least any one of the aforementioned features 1 through 10, Feature 11: the second calculator is configured to decrease the rate of increase based on a switching requirement being satisfied (or a switching condition being established), and the switching requirement is required for decreasing the rate of increase.

The electric power tool including at least features 1 through 11 can reduce a load required for a process of varying the rate of increase.

One embodiment may include, in addition to or in place of at least any one of the aforementioned features 1 through 11, Feature 12: a requirement setter (or a requirement setting circuit) configured to set the switching requirement based on the magnitude of the power-supply voltage detected by the voltage detector.

The electric power tool including at least features 1 through 12 can easily vary the rate of increase in accordance with the magnitude of the power-supply voltage.

One embodiment may include, in addition to or in place of at least any one of the aforementioned features 1 through 12, Feature 13: the switching requirement is satisfied based on the first duty ratio calculated by the second calculator having reached a first prescribed duty ratio.

The electric power tool including at least features 1 through 11, and 13 can easily set the switching requirement.

One embodiment may include, in addition to or in place of at least any one of the aforementioned features 1 through 13, at least one of:

Feature 14: the requirement setter is configured to calculate the first prescribed duty ratio based on the magnitude of the power-supply voltage detected by the voltage detector; and Feature 15: the switching requirement is satisfied based on the first duty ratio calculated by the second calculator having reached the first prescribed duty ratio.

The electric power tool including at least feature 1 through 12, 14, and 15 can easily set the switching requirement, and thereby can easily vary the rate of increase in accordance with the magnitude of the power-supply voltage.

One embodiment may include, in addition to or in place of at least any one of the aforementioned features 1 through 15, Feature 16: the requirement setter is configured to decrease the first prescribed duty ratio as the power-supply voltage detected by the voltage detector increases. In other words, the requirement setter calculates the first prescribed duty ratio so that the higher the power-supply voltage detected by the voltage detector, the lower the first prescribed duty ratio.

The electric power tool including at least features 1 through 12, and 14 through 16 can simply and effectively reflect the magnitude of the power-supply voltage on the first prescribed duty ratio.

One embodiment may include, in addition to or in place of at least any one of the aforementioned features 1 through 16, Feature 17: the switching requirement is satisfied based on the first duty ratio calculated by the second calculator having reached a second prescribed duty ratio, and the first prescribed duty ratio is smaller than the second prescribed duty ratio.

The requirement setter may be configured to decrease the first prescribed duty ratio as the power-supply voltage detected by the voltage detector increases.

The electric power tool including at least features 1 through 11, 13, and 17, or the electric power tool including at least features 1 through 12, 14, 15, and 17 can further effectively reduce the variation in the degree of acceleration of the rotational speed.

One embodiment may include, in addition to or in place of at least any one of the aforementioned features 1 through 17, at least one of:

Feature 18: the switching requirement is satisfied based on a first prescribed time period having elapsed since a measurement start timing; and Feature 19: the measurement start timing arrives based on a drive requirement to drive the motor being satisfied.

The electric power tool including at least features 1 through 11, 18, and 19 can easily set the switching requirement.

One embodiment may include, in addition to or in place of at least any one of the aforementioned features 1 through 19, at least one of:

Feature 20: the requirement setter is configured to calculate a first prescribed time period based on the magnitude of the power-supply voltage detected by the voltage detector;

Feature 21: the switching requirement is satisfied based on the first prescribed time period having elapsed since a measurement start timing; and Feature 22: the measurement start timing arrives based on a drive requirement to drive the motor being satisfied.

The electric power tool including at least features 1 through 12, and 20 through 22 can easily set the switching requirement, and thereby can easily vary the rate of increase in accordance with the magnitude of the power-supply voltage.

One embodiment may include, in addition to or in place of at least any one of the aforementioned features 1 through 22, Feature 23: the requirement setter is configured to shorten the first prescribed time period as the power-supply voltage detected by the voltage detector increases. In other words, the requirement setter is configured to calculate the first prescribed time period so that the higher the power-supply voltage detected by the voltage detector, the shorter the first prescribed time period.

The electric power tool including at least features 1 through 12, and 20 through 23 can simply and effectively reflect the magnitude of the power-supply voltage on the first prescribed time period.

One embodiment may include, in addition to or in place of at least any one of the aforementioned features 1 through 23, at least one of:

Feature 24: a manual switch configured to be manually moved (or manipulated) by a user of the electric power tool; and Feature 25: the drive requirement is satisfied based on the manual switch being manually moved by the user.

The electric power tool including at least features 1 through 11, 18, 19, 24, and 25, and the electric power tool including at least features 1 through 12, 20 through 22, 24, and 25 can further properly set the measurement start timing. In addition, the electric power tool can satisfy the switching requirement at an appropriate timing.

One embodiment may include, in addition to or in place of at least any one of the aforementioned features 1 through 25, Feature 26: the switching requirement is satisfied based on a second prescribed time period having elapsed since the measurement start timing, and the first prescribed time period is shorter than the second prescribed time period.

The requirement setter may be configured to shorten the second prescribed time period as the power-supply voltage detected by the voltage detector increases.

The electric power tool including at least features 1 through 11, 18, 19, and 26, and the electric power tool including at least features 1 through 12, 20 through 22, and 26 can further effectively reduce the variation in the degree of acceleration of the rotational speed.

One embodiment may include, in addition to or in place of at least any one of the aforementioned features 1 through 26, Feature 27: a third calculator (or a rate-of-increase calculator) configured to calculate a first rate of increase and/or a second rate of increase in accordance with the magnitude of the power-supply voltage detected by the voltage detector. The first rate of increase corresponds to the rate of increase of the first duty ratio from the initial value. The second rate of increase corresponds to the rate of increase of the first duty ratio after the switching requirement is satisfied. The second rate of increase is lower than the first rate of increase.

The electric power tool including at least features 1 through 11, and 27 can effectively reduce the variation in the degree of acceleration of the rotational speed.

One embodiment may include, in addition to or in place of at least any one of the aforementioned features 1 through 27, Feature 28: the third calculator is configured to decrease the first rate of increase and/or the second rate of increase as the power-supply voltage detected by the voltage detector increases. In other words, the third calculator is configured to calculate the first rate of increase and/or the second rate of increase so that the higher the power-supply voltage detected by the voltage detector, the lower the first rate of increase and/or the second rate of increase.

The electric power tool including at least features 1 through 11, 27, and 28 can simply and further effectively reflect the magnitude of the power-supply voltage on the rate of increase.

One embodiment may include, in addition to or in place of at least any one of the aforementioned features 1 through 28, Feature 29: the voltage detector is configured to detect the magnitude of the power-supply voltage before the motor is driven by the drive circuit.

The electric power tool including at least features 1 through 10, and 29 can properly reflect the magnitude of the power-supply voltage on variation in the rate of increase.

One embodiment may include, in addition to or in place of at least any one of the aforementioned features 1 through 29, Feature 30: the voltage detector is configured to detect the magnitude of the power-supply voltage (i) after a drive requirement is satisfied and (ii) before the motor is driven by the drive circuit. The drive requirement is required for driving the motor.

"(ii) Before the motor is driven by the drive circuit" may correspond to "before the drive circuit receives the drive signal".

The electric power tool may include the drive command generator. In this case, "(ii) before the motor is driven by the drive circuit" may correspond to "before the drive command generator outputs the drive command to the drive circuit (or before the drive signal is output).

The first calculator, the second calculator, the requirement setter, and/or the third calculator may achieve their respective functions based on the magnitude of the power-supply voltage detected by the voltage detector of the feature 29 or 30.

One embodiment may include, in addition to or in place of at least any one of the aforementioned features 1 through 30, Feature 31: a drive signal generator (or a drive signal generation circuit) configured to output the drive signal to the drive circuit. The drive signal has the first duty ratio calculated by the second calculator. The drive command generator may include the drive signal generator.

One embodiment may provide an electric power tool including the above-described features 1 to 6, and Feature 32: the desired duty ratio is required to rotate the motor at a specific desired rotational speed, or the desired duty ratio is a desired value of the first duty ratio for rotating the motor at the specific desired rotational speed;

Feature 33: a second calculator configured to increase the first duty ratio along a first profile;

Feature 34: the first profile is based on the magnitude of the power-supply voltage detected by the voltage detector;

Feature 35: the second calculator is configured to increase the first duty ratio from a specific initial value to the desired duty ratio;

Feature 36: the second calculator is configured to increase the first duty ratio along the first profile to thereby cause a rotational speed of the motor to reach the specific desired rotational speed along a first speed trajectory; and Feature 37: the first speed trajectory is constant (or the same) or substantially constant (substantially the same) regardless of the magnitude of the power-supply voltage detected.

The first profile may correspond to varying (or a process of varying) the first duty ratio in accordance with a lapse of time. The first speed trajectory may correspond to varying (or a process of varying) the rotational speed in accordance with a lapse of time.

The electric power tool including at least features 1 through 6, and 32 through 37 can reduce the variation in the degree of acceleration of the rotational speed of the motor due to the magnitude of the power-supply voltage.

One embodiment may provide a method for controlling a motor in an electric power tool, the method including at least any one of:

Feature 38: calculating a desired value of a duty ratio based on a magnitude of a power-supply voltage, the desired value being required to rotate the motor at a desired rotational speed;

Feature 39: the desired rotational speed may be determined in advance;

Feature 40: increasing the duty ratio from a specific initial value to the desired value in accordance with a lapse of time;

Feature 41: varying a rate of increase of the duty ratio based on the magnitude of the power-supply voltage; and Feature 42: applying the power-supply voltage to the motor in accordance with the duty ratio to thereby drive the motor.

The method including at least features 38 to 42 can reduce variation in the degree of acceleration of the rotational speed of the motor due to the magnitude of the power-supply voltage.

In one embodiment, the electric power tool may include a control circuit. The control circuit may include the voltage detector, the first calculator, the second calculator, the third calculator, and/or the drive signal generator (or the drive command generator).

In one embodiment, the control circuit may be integrated into a single electronic unit, a single electronic device, or a single circuit board.

In one embodiment, the control circuit may be a combination of two or more electronic circuits, a combination of two or more electronic units, or a combination of two or more electronic devices, each of which is individually disposed inside the electric power tool.

In one embodiment, the control circuit may include a microcomputer (or microcontroller, or microprocessor), a wired logic, an application specific IC (ASIC), an application specific standard product (ASSP), a programmable logic device (such as, for example, a field programmable gate array (FPGA)), a discrete electronic component, and/or a combination of the above.

Examples of the electric power tool include various job-site electric apparatus used in work sites, such as do-it-yourself carpentry, manufacturing, gardening, and construction. The examples of the electric power tool may be configured to be driven by a battery, or may be configured to receive an AC power to be driven.

The examples of the electric power tool specifically includes an electric power tool for masonry work, metal-working, or woodworking. More specifically, the examples of the electric power tool include, for example, an electric driver and an electric wrench.

In one embodiment, the aforementioned features 1 through 42 may be combined in any manner.

In one embodiment, any of the aforementioned features 1 through 42 may be excluded.

2. Specific Example Embodiments

Some specific example embodiments will be described below. These specific example embodiments are merely one example. The present disclosure is not limited to these embodiments, and may be practiced in any form.

2-1. First Embodiment 2-1-1. Configuration of Electric Power Tool

As shown in FIG. 1, a first embodiment provides an electric power tool 1. The electric power tool 1 of the first embodiment is in the form of an impact driver. The impact driver rotates a fastener provided with a screw thread. The fastener may be in the form of, for example, various types of screws, bolts, or nuts. Various types of screws may include, for example, wood screws and drill screws. The impact driver can apply to a fastener a hammering force in a rotation direction (or a rotational direction) of the fastener while rotating the fastener. The electric power tool 1 of the first embodiment is driven by an electric power of a later-described battery 3a (see FIG. 2) (hereinafter, referred to as a "battery power").

As shown in FIG. 1, the electric power tool 1 includes a main body 2. The electric power tool 1 includes a battery pack 3. The battery pack 3 of the first embodiment is detachably attached to the main body 2. The battery pack 3 (or battery 3a) may be non-detachably fixed to the main body 2. The battery pack 3 supplies the battery power to the main body 2.

The main body 2 includes a housing 4. The main body 2 includes a grip 5. The grip 5 is provided at a lower end of the housing 4. In the first embodiment, the grip 5 extends downward from the housing 4. The grip 5 is gripped by a user of the electric power tool 1.

The main body 2 includes a battery port 6. The battery port 6 is provided at a lower end of the grip 5. The battery pack 3 is detachably attached to the battery port 6.

The main body 2 includes a chuck sleeve 7. The chuck sleeve 7 is provided at a front end of the housing 4. A tool bit is detachably attached to the chuck sleeve 7. The tool bit may be in the form of, for example, a driver bit or a socket bit. FIG. 1 schematically shows a driver bit 7a. When the chuck sleeve 7 rotates, the tool bit attached to the chuck sleeve 7 rotates with the chuck sleeve 7 (that is, integrally). The chuck sleeve 7 is rotated by a later-described motor 21.

The main body 2 includes a trigger 8. The trigger 8 is provided in an upper front of the grip 5. The trigger 8 is manually moved (or manipulated) by the user. Specifically, the trigger 8 of the first embodiment is moved (or pulled) by the user. More specifically, the trigger 8 of the first embodiment is moved rearward and thereby pushed into the main body 2. The electric power tool 1 operates in response to the trigger 8 being pulled.

The main body 2 includes a direction setting switch 10. The direction setting switch 10 specifies a rotation direction of the motor 2 (and a rotation direction of the chuck sleeve 7). Specifically, the direction setting switch 10 alternatively specifies the rotation direction of the chuck sleeve 7 to a first direction or a second direction.

The direction setting switch 10 is provided near the boundary between the housing 4 and the grip 5. The direction setting switch 10 of the first embodiment is manually moved by the user to the right or left direction. Specifically, the direction setting switch 10 is moved to a first position or a second position by the user.

When the direction setting switch 10 is moved to the first position, the rotation direction of the chuck sleeve 7 is set to the first direction. In other words, the rotation direction of the motor 21 is set to a first motor rotation direction. The first motor rotation direction corresponds to a direction to rotate the chuck sleeve 7 in the first direction. The motor 21 rotates in the first motor rotation direction when (i) the direction setting switch 10 is moved to the first position and (ii) the trigger 8 is pulled. When the motor 21 rotates in the first motor rotation direction, the chuck sleeve 7 rotates in the first direction. The first direction may coincide with the first motor rotation direction, or may be opposite to the first motor rotation direction. In the first embodiment, the first direction coincides with the first motor rotation direction. The first direction may be, for example, a clockwise direction (or a right-handed direction).

The first direction corresponds to a direction to tighten the fastener to a fastened material. Specifically, when the tool bit rotates in the first direction, the tool bit rotates the fastener in the first direction. When the fastener is rotated in the first direction, the fastener is tightened to the fastened material.

The fastened material may be in any form. The fastened material may be in the form of, for example, wood, metal, concrete, or gypsum board. In a combination of a bolt and a nut, the bolt and the nut may be a fastening material and a fastened material, or a fastened material and a fastening material, respectively. For example, assume a first case where the nut is tightened onto the bolt by rotating the nut with the tool bit. In this case, the nut corresponds to the fastener, and the bolt corresponds to the fastened material. Conversely, assume a second case where the bolt is tightened to the nut by rotating the bolt with the tool bit. In this case, the bolt corresponds to the fastener, and the nut corresponds to the fastened material.

When the direction setting switch 10 is moved to the second position, the rotation direction of the chuck sleeve 7 is set to the second direction. In other words, the rotation direction of the motor 21 is set to a second motor rotation direction. The second motor rotation direction corresponds to a direction to rotate the chuck sleeve 7 in the second direction. The motor 21 rotates in the second motor rotation direction when (i) the direction setting switch 10 is moved to the second position and (ii) the trigger 8 is pulled. When the motor 21 rotates in the second motor rotation direction, the chuck sleeve 7 rotates in the second direction. The second direction may coincide with the second motor rotation direction or may be opposite to the second motor rotation direction. In the first embodiment, the second direction coincides with the second motor rotation direction. The second direction may be, for example, a counterclockwise direction (or a left-handed direction).

The second direction corresponds to a direction to loosen (or release or remove) the fastener from the fastened material. Specifically, when the tool bit is rotated in the second direction, the tool bit rotates the fastener in the second direction. When the fastener is rotated in the second direction, the fastener is loosened from the fastened material.

The direction setting switch 10 may be movable also to a third position. The third position may be, for example, midway between the first position and the second position. When the direction setting switch 10 is moved to the third position, rotation of the motor 21 may be prohibited. Specifically, the electric power tool 1 may be configured such that, when the direction setting switch 10 is moved to the third position, the motor 21 is not rotated even if the trigger 8 is pulled. Also, for example, when the direction setting switch 10 is moved to the third position, movement of the trigger 8 itself may be mechanically restricted.

The main body 2 includes an operation panel 11. In the first embodiment, the operation panel 11 is provided on the battery port 6. The operation panel 11 may include, for example, one or more buttons and/or one or more display devices.

The electric power tool 1 includes the motor 21. The motor 21 is housed in the housing 4. The motor 21 includes a shaft 21a. Rotation of the motor 21 corresponds to rotation of the shaft 21a.

The electric power tool 1 includes a driving mechanism 22. The driving mechanism 22 is housed in the housing 4. The driving mechanism 22 is disposed in front of the motor 21 and behind the chuck sleeve 7. The driving mechanism 22 transmits the rotation of the motor 21 (that is, the rotation of the shaft 21a) to the chuck sleeve 7. When the motor 21 rotates, the chuck sleeve 7 rotates via the driving mechanism 22.

The driving mechanism 22 includes a hammering mechanism 23. The hammering mechanism 23 includes a spindle 24. The driving mechanism 22 includes a planetary gear mechanism 26. The shaft 21a is coupled to the planetary gear mechanism 26. The planetary gear mechanism 26 transmits the rotation of the motor 21 to the spindle 24. When the motor 21 rotates, the spindle 24 rotates.

The hammering mechanism 23 includes a hammer 28, an anvil 29, and a coil spring 30. The hammer 28 is coupled to the spindle 24. The hammer 28 is rotatable integrally with the spindle 24. The hammer 28 is also movable along a rotation axis of the spindle 24 (that is, in a front-rear direction). The hammer 28 is biased forward by the coil spring 30. The anvil 29 receives a rotational force and/or a hammering force from the hammer 28 to thereby rotate. The chuck sleeve 7 is attached to a front end of the anvil 29.

In the first embodiment, a rotation axis of the motor 21 (that is, a rotation axis of the shaft 21a), the rotation axis of the spindle 24, a rotation axis of the hammer 28, a rotation axis of the anvil 29 and a rotation axis of the chuck sleeve 7 coincide with each other.

The hammer 28 includes first and second hammering protrusions 28a, 28b. The first and second hammering protrusions 28a, 28b apply the rotational force and/or the hammering force to the anvil 29. The first and second hammering protrusions 28a, 28b are separated from each other, for example, by 1800 along a rotation direction of the hammer 28. The first and second hammering protrusions 28a, 28b protrude forward from a front end surface of the hammer 28.

The anvil 29 includes a first hammering arm 29a and a second hammering arm 29b at a rear end thereof. The first and second hammering arms 29a, 29b are separated from each other, for example, by 1800 along the rotation direction of the hammer 28.

When the hammer 28 is biased forward by the coil spring 30, the first and second hammering protrusions 28a, 28b are brought into a state where the first and second hammering protrusions 28a, 28b can respectively contact the first and second hammering arms 29a, 29b in their rotation directions. The first and second hammering protrusions 28a, 28b each has a hammer-side contact surface. The hammer-side contact surface contacts the first hammering arm 29a or the second hammering arm 29b. The hammer-side contact surface may be, for example, perpendicular to or substantially perpendicular to the rotation direction of the hammer 28. The first and second hammering arms 29a, 29b each has an arm-side contact surface. The arm-side contact surface contacts the hammer-side contact surface of the first hammering protrusion 28a or the second hammering protrusion 28b. The arm-side contact surface may be, for example, perpendicular to or substantially perpendicular to the rotation direction of the anvil 29.

When the spindle 24 is rotated by the motor 21, the hammer 28 rotates integrally with the spindle 24. When the hammer 28 rotates in a hammer-anvil contact state, the rotational force of the hammer 28 is transmitted to the anvil 29 via the first and second hammering protrusions 28a, 28b and the first and second hammering arms 29a, 29b. This causes the anvil 29 to rotate. The hammer-anvil contact state corresponds to a state where the first and second hammering protrusions 28a, 28b respectively contact the first and second hammering arms 29a, 29b in their rotation directions. When the anvil 29 rotates, the chuck sleeve 7 rotates integrally with the anvil 29. This causes the tool bit attached to the chuck sleeve 7 to rotate.

During the rotation of the motor 21, the hammer 28 may receive a load torque from the fastener via the chuck sleeve 7 and the anvil 29. The load torque is a torque in a direction opposite to the rotation direction of the hammer 28. The hammer 28, when receiving a first torque during the rotation of the hammer 28, is displaced rearward. The first torque corresponds to the load torque greater than or equal to a specified amount. The first torque applies a rearward force greater than a biasing force of the coil spring 30 to the hammer 28. The hammer 28 is displaced rearward by the rearward force while applying the rotational force to the anvil 29.

Specifically, the first and second hammering protrusions 28a, 28b are displaced rearward while respectively contacting the first and second hammering arms 29a, 29b. As the rearward displacement of the hammer 28 proceeds, the first and second hammering protrusions 28a, 28b (i) respectively climb over the first and second hammering arms 29a, 29b in their rotation directions and (ii) respectively move away from the first and second hammering arms 29a, 29b in their rotation directions. This causes the hammer 28 to spin, and displaces the hammer 28 forward by the biasing force of the coil spring 30. As a result, the first and second hammering protrusions 28a, 28b collide with the first and second hammering arms 29a, 29b. In other words, the first and second hammering protrusions 28a, 28b hit the first and second hammering arms 29a, 29b in their rotation directions.

Such hitting (that is, hammering) is repeatedly performed while the hammer 28 is receiving the first torque. In other words, while the hammer 28 is receiving the first torque, the anvil 29 receives intermittent hammerings from the hammer 28.

When hammering occurs while the motor 21 rotates in the first motor rotation direction, the fastener is tightened to the fastened material with high torque. When hammering occurs while the motor 21 rotates in the second motor rotation direction, the fastener is loosened from the fastened material with high torque.

The main body 2 includes a controller 16. The controller 16 controls various functions of the electric power tool 1. Various functions include driving the motor 21. Detailed configuration of the controller 16 will be described by way of FIGS. 2 and 3.

The main body 2 includes a switch box 15. The switch box 15 is mechanically coupled to the trigger 8. As will be described later, the switch box 15 outputs various signals to the controller 16. The various signals are in accordance with the state (specifically, a pulling amount or a moving length or a moving amount) of the trigger 8.

2-1-2. Electrical Configuration of Electric Power Tool

Figure 2:
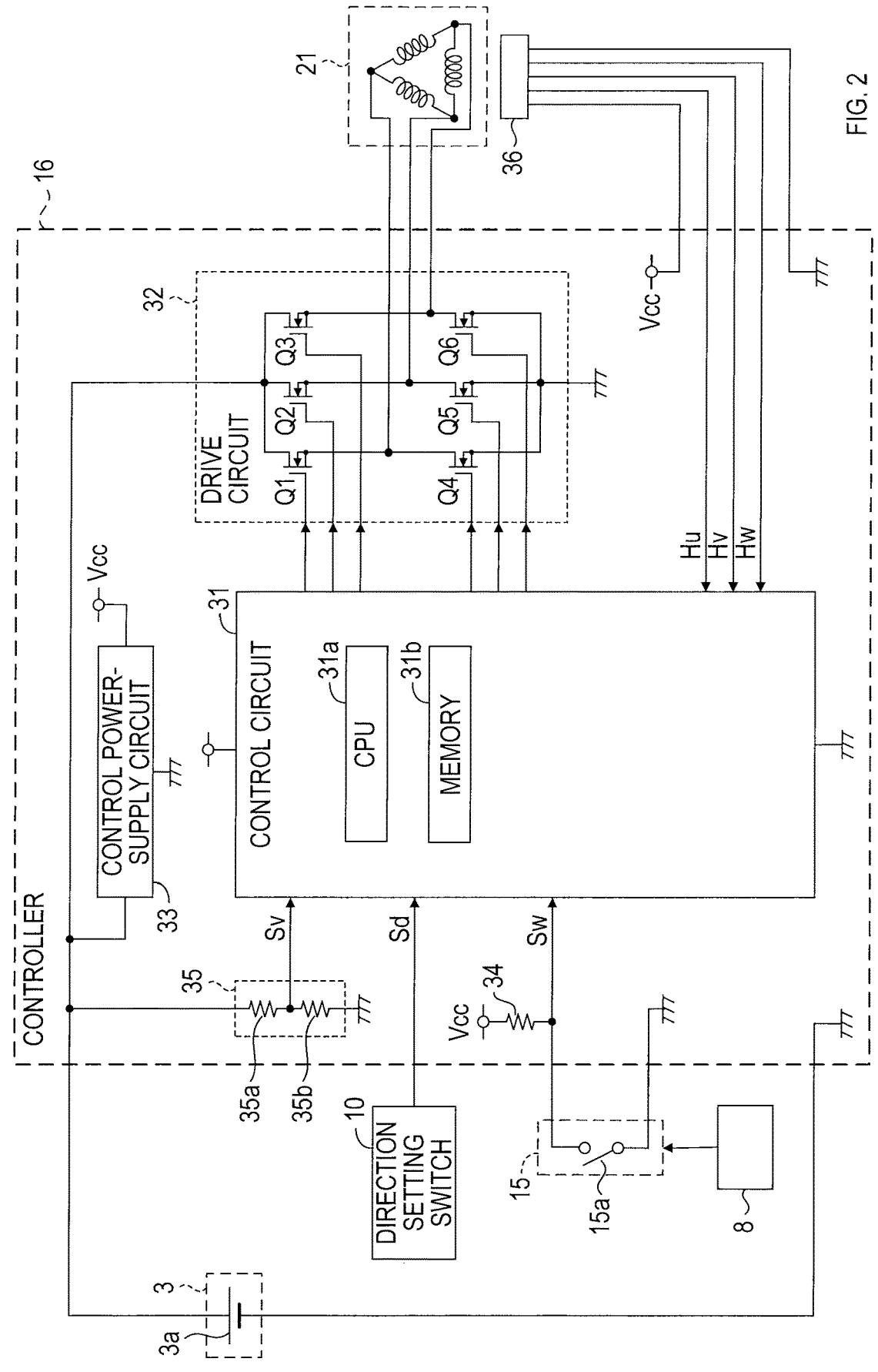
FIG. 2 is an electric circuit diagram showing an electrical configuration of the electric power tool of the first embodiment.

Referring to FIG. 2, a supplementary description of the electrical configuration of the electric power tool 1 will be given. FIG. 2 shows a state where the battery pack 3 is attached to the main body 2.

The battery pack 3 includes the battery 3a. The battery 3a may be a rechargeable battery. The battery 3a may include, for example, two or more lithium-ion battery cells coupled to each other in series. The battery 3a may include a rechargeable battery cell different from a lithium-ion battery cell.

The electric power tool 1 includes the aforementioned controller 16. When the battery pack 3 is attached to the main body 2, the controller 16 is electrically coupled to the battery 3a. This supplies the battery power to the controller 16.

The electric power tool 1 includes the aforementioned motor 21. The motor 21 of the first embodiment is in the form of a brushless DC motor (or brushless motor). The motor 21 includes a rotor 19. The rotor 19 includes a permanent magnet. The aforementioned shaft 21a is fixed to the rotor 19 and rotates with the rotor 19.

The motor 21 is driven by the battery power. The motor 21 receives the battery power via a later-described drive circuit 32. The drive circuit 32 converts the battery power to a three-phase power. The motor 21 receives the three-phase power. The motor 21 of the first embodiment includes three windings. The three-phase power is supplied to the three windings. The motor 21 rotates when the three-phase power is supplied to the three windings. FIG. 2 shows the three windings connected in a delta configuration. The three windings may be connected to each other in a manner different from the delta configuration.

The electric power tool 1 includes a rotation sensor 36. The rotation sensor 36 outputs rotational position information. The rotational position information may indicate whether the motor 21 is rotating. The rotational position information may vary (or change) in accordance with the rotational position and/or the rotational speed of the motor 21. The rotational position information may indicate the rotational position of the motor 21, more specifically the rotational position of the rotor 19. The rotational position information of the first embodiment includes a first position signal Hu, a second position signal Hv and a third position signal Hw. The rotational position information is input to a control circuit 31.

The rotation sensor 36 of the first embodiment includes three Hall sensors (not shown). The three Hall sensors are arranged near the rotor 19. Specifically, the three Hall sensors are separated from each other by an angle corresponding to the electrical angle of 120 degrees along a rotation direction of the shaft 21a. The first to third position signals Hu, Hv, Hw are output from the three respective Hall sensors.

The rotation sensor 36 operates with an electric power from the controller 16. Specifically, the rotation sensor 36 is electrically coupled to a control power-supply line and a ground line, which will be described later, in the controller 16. The rotation sensor 36 receives a control voltage Vcc from the control power-supply line, and operates with the control voltage Vcc.

The electric power tool 1 includes the aforementioned switch box 15. The switch box 15 includes a trigger switch 15a. The trigger switch 15a operates in conjunction with the movement of the trigger 8.

Specifically, when the trigger 8 is manually moved (or manipulated), the trigger switch 15a is turned ON. When the trigger 8 is not operated, the trigger switch 15a is turned OFF. The trigger switch 15a is provided to detect whether the trigger 8 is manipulated. The trigger switch 15a has a first end and a second end electrically coupled to the controller 16.

The electric power tool 1 includes the aforementioned direction setting switch 10. The direction setting switch 10 outputs a direction setting signal Sd. The direction setting signal Sd indicates the position of the direction setting switch 10. Specifically, the direction setting signal Sd indicates which of the first motor rotation direction and the second motor rotation direction is selected (or specified).

The controller 16 includes the control circuit 31 and the drive circuit 32. The control circuit 31 directly controls the drive circuit 32, and thereby controls the rotation of the motor 21.

The drive circuit 32 receives the battery power from the battery 3a. Specifically, the drive circuit 32 is electrically coupled to a positive electrode of the battery 3a. The drive circuit 32 is further electrically coupled to the ground line in the controller 16. The ground line is electrically coupled to a negative electrode of the battery 3a.

The drive circuit 32 is coupled to the motor 21. The drive circuit 32, as described above, converts the battery power to the three-phase power, and supplies the three-phase power to the motor 21. The drive circuit 32 of the first embodiment is in the form of a three-phase full-bridge circuit. The three-phase full-bridge circuit includes six switches Q1, Q2, Q3, Q4, Q5, Q6. The switches Q1-Q6 may take any forms. In the first embodiment, each of the switches Q1-Q6 is, for example, an n-channel metal oxide semiconductor field-effect transistor (MOSFET).

The six switches Q1-Q6 include three high-side switches Q1, Q2, Q3 and three low-side switches Q4, Q5, Q6. The high-side switches Q1-Q3 are electrically coupled to the positive electrode of the battery 3a via a battery power path to be described later. The low-side switches Q4-Q6 are electrically coupled to the negative electrode of the battery 3a via the ground line. As shown in FIG. 2, sources of the high-side switches Q1-Q3 are respectively coupled to drains of the low-side switches Q4-Q6. The sources of high-side switches Q1-Q3 (in other words, the drains of the low-side switches Q4-Q6) are electrically coupled to the motor 21. When one of the high-side switches that is selected and one of the low-side switches that is selected (but is not coupled to the source of the selected high-side switch) are turned ON, the battery power is supplied to the motor 21. Specifically, the battery power is supplied to the motor 21 via the selected high-side switch and the selected low-side switch. This drives the motor 21.

The controller 16 includes a voltage signal output circuit 35. The voltage signal output circuit 35 is electrically coupled to the battery power path. The battery power path extends from the positive electrode of the battery 3a to the drive circuit 32. The voltage signal output circuit 35 outputs a voltage signal Sv. The voltage signal Sv indicates a magnitude of voltage of the battery power path.

The voltage signal output circuit 35 includes a first resistor 35a and a second resistor 35b. A first end of the first resistor 35a is electrically coupled to the battery power path. A second end of the first resistor 35a is coupled to a first end of the second resistor 35b. A second end of the second resistor 35b is electrically coupled to the ground line. The voltage at the second end of the first resistor 35a (in other words, the voltage at the first end of the second resistor 35b) corresponds to the voltage signal Sv.

In the first embodiment, the voltage of the battery power path is equal to or substantially equal to the voltage of the positive electrode of the battery 3a. In the first embodiment, the voltage of the battery power path is equal to or substantially equal to a voltage input from the battery power path to the drive circuit 32 (hereinafter, referred to as "power-supply voltage"). Accordingly, in the first embodiment, the voltage signal Sv indicates the magnitude of voltage of the battery 3a and/or the magnitude of the power-supply voltage. In other words, in the first embodiment, the power-supply voltage is equal to or substantially equal to the voltage of the battery 3a. The power-supply voltage is applied to the motor 21 via the drive circuit 32.

The controller 16 includes a control power-supply circuit 33. The control power-supply circuit 33 receives the battery power from the battery 3a. The control power-supply circuit 33 (i) generates the control voltage Vcc from the battery power, and (ii) outputs the control voltage Vcc to the control power-supply line. The control voltage Vcc is, for example, a direct voltage having a voltage of fixed magnitude. The control voltage Vcc is supplied to each part of the controller 16 (including the control circuit 31) via the control power-supply line. The control circuit 31 operates with the control voltage Vcc.

The control voltage Vcc is also supplied to the switch box 15. Specifically, the control voltage Vcc is applied to the first end of the trigger switch 15a via the resistor 34. The second end of the trigger switch 15a is electrically coupled to the ground line.

The first end of trigger switch 15a is electrically coupled to the control circuit 31. The voltage at the first end of the trigger switch 15a is input to the control circuit 31 as a trigger signal Sw. The trigger signal Sw indicates whether the trigger switch 15a is turned ON, in other words, whether the trigger 8 is pulled.

The control circuit 31 of the first embodiment is in the form of microcomputer or a micro control unit (MCU) including a CPU 31a and a memory 31b. The memory 31b includes, for example, a semiconductor memory such as a ROM, a RAM, a NVRAM, and a flash memory.

The control circuit 31 implements various functions by executing a program stored in a non-transitory tangible storage medium. In the present embodiment, the memory 31b corresponds to the non-transitory tangible storage medium that stores the program. In the present embodiment, the memory 31b stores a program for a later-described motor control process (see FIG. 7).

A portion or all of the various functions implemented by the control circuit 31 may be achieved by execution of the program (that is, software processing), or by one or more hardware elements. For example, the control circuit 31 may include, instead of a microcomputer or in addition to a microcomputer, a wired logic (or a hard wired circuit), ASIC, ASSP, a programmable logic device, a discrete electronic component, and/or a combination of the above.

The control circuit 31 receives the rotational position information (that is, the first to third position signals Hu, Hv, Hw), the voltage signal Sv, the trigger signal Sw and the direction setting signal Sd.

The control circuit 31 detects the rotational position of the motor 21 (that is, the rotational position of the rotor 19) based on the rotational position information. The control circuit 31 detects the magnitude of the power-supply voltage based on the voltage signal Sv. The control circuit 31 detects whether the trigger 8 is manipulated based on the trigger signal Sw. The control circuit 31 detects which of the first motor rotation direction and the second motor rotation direction is specified based on the direction setting signal Sd. The control circuit 31 sets the rotation direction of the motor 21 to the direction specified by the direction setting signal Sd.

The control circuit 31 outputs a drive command to the drive circuit 32. The drive circuit 32 supplies the three-phase power to the motor 21 in accordance with the drive command. The drive command includes six drive signals for the switches Q1-Q6. The control circuit 31 sets, for example, one of the switches Q1-Q6 to an ON hold switch, and sets another switch to a PWM switch.

More specifically, the control circuit 31 sets, for example, one of the high-side switches Q1-Q3 to the ON hold switch and one of the low-side switches Q4-Q6 to the PWM switch.

The drive circuit 32 can be divided into three systems. The three systems include a first system, a second system and a third system. The first system includes the switch Q1 and the switch Q4. The second system includes the switch Q2 and the switch Q5. The third system includes the switch Q3 and the switch Q6. The PWM switch belongs to the system different from the system to which the ON hold switch belongs. In other words, one of the two low-side switches that are not coupled to a source of the ON hold switch is set to the PWM switch.

The ON hold switch is held in an ON-state. Specifically, the control circuit 31 outputs a drive signal for holding the ON-state to the ON hold switch. On the other hand, the PWM switch is PWM-driven. PWM-driving means periodically turning ON and OFF the PWM switch in accordance with a pulse-width modulation signal. The control circuit 31 outputs a drive signal in the form of a pulse-width modulation signal (hereinafter, referred to as "PWM drive signal") to the PWM switch to thereby PWM-drive the PWM switch.

As above, in the first embodiment, the power-supply voltage is intermittently applied to the motor 21 in accordance with the PWM drive signal. A mean value of the voltage applied to the motor 21 varies in accordance with a duty ratio of the PWM drive signal (hereinafter, referred to as "first duty ratio DS" (or "setting duty ratio DS")). Specifically, the mean value of the voltage applied to the motor 21 increases as the first duty ratio DS increases.

The first duty ratio DS is calculated by the control circuit 31. As will be described later, in the first embodiment, the control circuit 31 gradually increases the first duty ratio DS from an initial value to a desired value (or target value) (hereinafter, referred to as "desired duty ratio Dd" (or "target duty ratio Dd")) in a transitional period immediately after the motor 21 is started. The control circuit 31 determines and/or varies (or changes) a rate of increase of the first duty ratio DS during the transitional period in accordance with the power-supply voltage. The initial value may be determined in any way. The initial value may be, for example, 0% or may be greater than 0%.

When the drive command including the PWM drive signal is output from the control circuit 31 to the drive circuit 32, the power-supply voltage is applied to the motor 21 in accordance with the first duty ratio DS of the PWM drive signal. This drives the motor 21.

The control circuit 31 switches the combination of the ON hold switch and the PWM switch in accordance with the rotational position of the motor 21. Specifically, the control circuit 31 switches the combination of the ON hold switch and the PWM switch each time the motor 21 rotates a specified angle (for example, an angle corresponding to an electrical angle of 60 degrees). This causes the motor 21 to rotate continuously.

One of the low-side switches Q4-Q6 may be set to the ON hold switch, and one of the high-side switches Q1-Q3 may be set to the PWM switch.

2-1-3. Motor Control

The control circuit 31 rotates the motor 21 in the set rotation direction in response to the trigger 8 being manipulated.

Specifically, when the trigger 8 is manipulated, the control circuit 31 calculates the desired duty ratio Dd in accordance with the magnitude of the power-supply voltage. In the first embodiment, a desired rotational speed Rd (or target rotational speed Rd) of the motor 21 is determined in advance. The desired duty ratio Dd corresponds to the duty ratio of the PWM drive signal for rotating the motor 21 at the desired rotational speed Rd. The desired rotational speed Rd may be, for example, stored in the memory 31b in advance.

If the power-supply voltage is different, the rotational speed of the motor 21 is also different even if the first duty ratio DS of the PWM drive signal is constant. Specifically, the lower the power-supply voltage, the lower the electric power to the motor 21, even if the first duty ratio DS is constant, resulting in that the rotational speed of the motor 21 is low.

Thus, in the first embodiment, the desired duty ratio Dd is calculated so that the motor 21 rotates at the desired rotational speed Rd regardless of the magnitude of the power-supply voltage. Specifically, the desired duty ratio Dd is calculated in accordance with the magnitude of the power-supply voltage when the desired duty ratio Dd is calculated (in detail, in the first embodiment, when the trigger 8 is manipulated and immediately before the motor 21 is started). More specifically, the desired duty ratio Dd increases as the power-supply voltage decreases. For example, the desired duty ratio Dd set when the power-supply voltage is V01 is greater than the desired duty ratio Dd set when the power-supply voltage is V02 (>V01). The PWM drive signal has the desired duty ratio Dd calculated as such. As the desired duty ratio Dd is calculated in this manner, the motor 21 can be rotated at the desired rotational speed Rd regardless of the magnitude of the power-supply voltage.

The control circuit 31, when starting to output the PWM drive signal (that is, when starting the motor 21), does not set the first duty ratio DS to the desired duty ratio Dd immediately. The control circuit 31 first (i) sets the first duty ratio DS to the initial value, and (ii) outputs the PWM drive signal in accordance with the initial value. Then, the control circuit 31 increases the first duty ratio DS from the initial value to the desired duty ratio Dd in accordance with a lapse of time. The control circuit 31 further switches (or varies) the rate of increase of the first duty ratio DS in accordance with a switching requirement (or a switching condition). The rate of increase corresponds to the increase of the first duty ratio DS per unit time (for example, one second or one millisecond). The switching requirement is required to switch the rate of increase. The switching requirement is, for example, determined in advance.

The control circuit 31 first sets the rate of increase to a first rate of increase Pi1. Then, the control circuit 31 increases the first duty ratio DS from the initial value in accordance with the first rate of increase Pi1.

Then, based on the switching requirement being satisfied (or being met), the control circuit 31 switches the rate of increase from the first rate of increase Pi1 to a second rate of increase Pi2. The second rate of increase Pi2 is smaller than the first rate of increase Pi1. Switching the rate of increase to the second rate of increase Pi2 moderates an increase in the first duty ratio DS.

When the switching requirement is again satisfied after the rate of increase is switched to the second rate of increase Pi2, the control circuit 31 switches the rate of increase from the second rate of increase Pi2 to a third rate of increase Pi3. The third rate of increase Pi3 is smaller than the second rate of increase Pi2. Thus, switching the rate of increase to the third rate of increase Pi3 further moderates the increase in the first duty ratio DS.

A configuration of the control circuit 31 that implements a control of the motor 21 as described above will be specifically explained with reference to FIG. 3. In the first embodiment, the control of the motor 21 (directly, the control of the drive circuit 32) by the control circuit 31 is implemented by the CPU 31a executing a computer program (that is, by software processing). The computer program includes the program of the motor control process shown in FIG. 7. The motor control process controls the rotation of the motor 21. The control circuit 31 (in detail, the CPU 31a) functions as shown in FIG. 3 (that is, functions as blocks in the control circuit 31 shown in FIG. 3) by executing the program of the motor control process.

Figure 3:
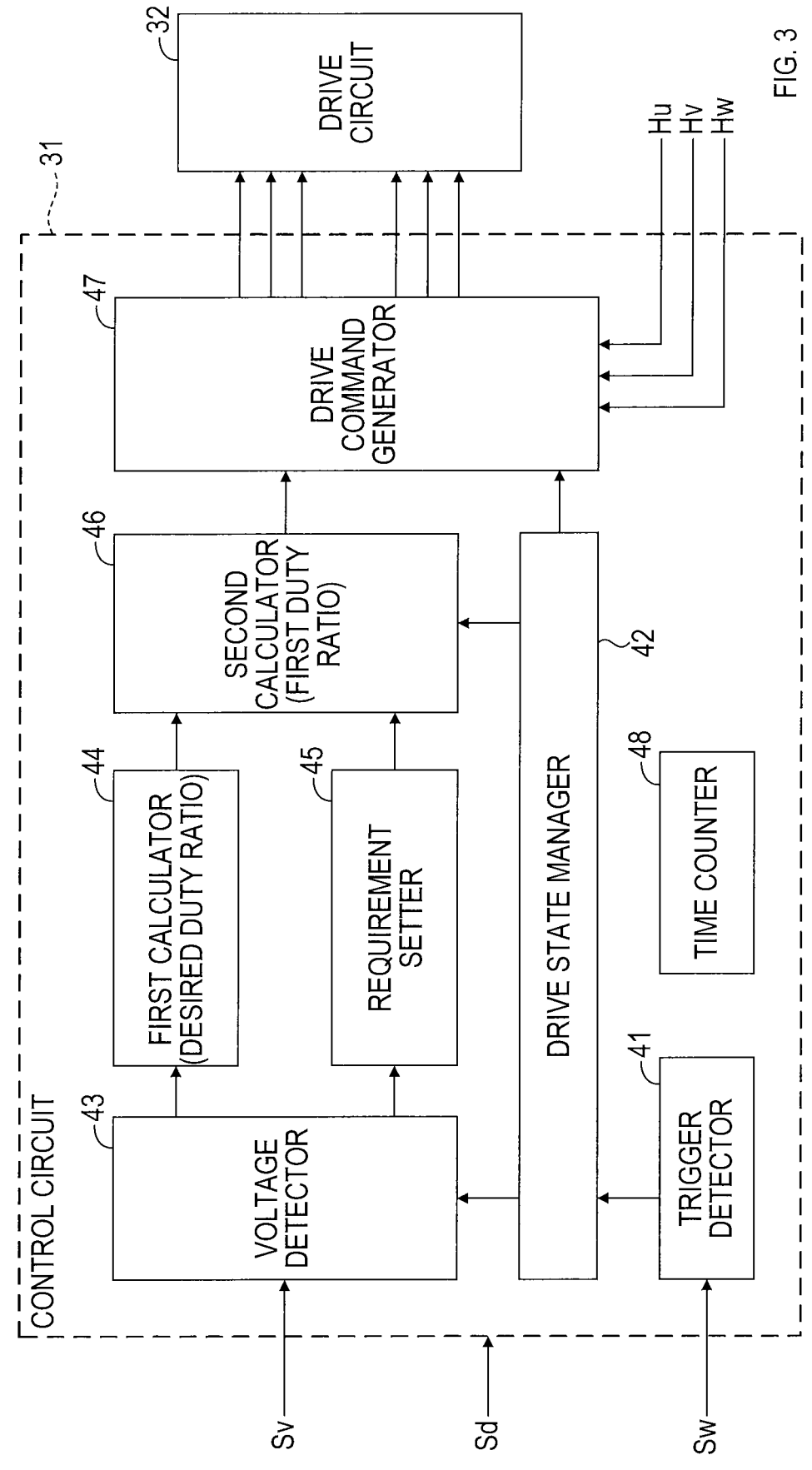
FIG. 3 is a block diagram showing a function of a control circuit of the first embodiment.

As shown in FIG. 3, the control circuit 31 includes a trigger detector (or a trigger detection circuit) 41. The trigger detector 41 receives the trigger signal Sw from the switch box 15. The trigger detector 41 detects whether the trigger 8 is manipulated based on the trigger signal Sw.

The control circuit 31 includes a drive state manager (or a drive state managing circuit) 42. The drive state manager 42 manages the state of the motor 21. Specifically, the drive state manager 42 determines whether the trigger 8 is manipulated from a result of detection by the trigger detector 41. If the trigger 8 manipulated, the drive state manager 42 operates a voltage detector 43, a second calculator 46 and a drive command generator 47, which will be described later, to thereby drive the motor 21.

The control circuit 31 includes the aforementioned voltage detector 43. The voltage detector 43 (i) receives the voltage signal Sv, and (ii) detects the magnitude of the power-supply voltage based on the voltage signal Sv. The voltage detector 43 of the first embodiment detects the magnitude of the power-supply voltage at least (i) after the trigger 8 is manipulated and (ii) before the motor 21 is driven (that is, before the drive command is output). In other words, the voltage detector 43 detects the magnitude of the power-supply voltage when the power-supply voltage is not applied to the motor 21.

The control circuit 31 includes a first calculator 44. The first calculator 44 calculates the desired duty ratio Dd. The first calculator 44 calculates the desired duty ratio Dd, for example, when the trigger 8 is manipulated. The first calculator 44 calculates the desired duty ratio Dd based on the magnitude of the power-supply voltage detected by the voltage detector 43. Specifically, the first calculator 44 calculates the desired duty ratio Dd so that the motor 21 rotates at the desired rotational speed Rd regardless of the magnitude of the power-supply voltage. More specifically, the first calculator 44 calculates the desired duty ratio Dd so that the lower the power-supply voltage, the higher the desired duty ratio Dd, as described above.

The control circuit 31 includes a requirement setter 45. As described above, in the first embodiment, when the switching requirement is satisfied, the rate of increase of the first duty ratio DS is switched. The requirement setter 45 sets the switching requirement based on the magnitude of the power-supply voltage detected by the voltage detector 43. Specifically, the control circuit 31 calculates one or more prescribed duty ratios. The switching requirement is satisfied each time the first duty ratio DS calculated in the second calculator 46 reaches any one of the one or more prescribed duty ratios.

The requirement setter 45 of the first embodiment calculates a first prescribed duty ratio Dp1 and a second prescribed duty ratio Dp2. The second prescribed duty ratio Dp2 is greater than the first prescribed duty ratio Dp1. Accordingly, after the motor 21 is started, when the first duty ratio DS reaches the first prescribed duty ratio Dp1, the switching requirement is satisfied. Thereafter, when the first duty ratio DS reaches the second prescribed duty ratio Dp2, the switching requirement is again satisfied.

The requirement setter 45 calculates the respective one or more prescribed duty ratios based on the magnitude of the power-supply voltage detected. Specifically, the requirement setter 45, as illustrated in a right side portion of FIG. 6, calculates the one or more prescribed duty ratios so that the higher the power-supply voltage, the lower the respective one or more prescribed duty ratios (in the first embodiment, the first and second prescribed duty ratios Dp1, Dp2). In other words, the one or more prescribed duty ratios decrease as the power-supply voltage increases.

The one or more prescribed duty ratios in accordance with the power-supply voltage may be determined in any manner. The one or more prescribed duty ratios may be determined, for example, by experiment. For example, a degree of acceleration (or an acceleration) of the rotational speed when the power-supply voltage is a maximum value in product specifications may be set as a reference degree of acceleration (or a reference acceleration). Then, the number of the one or more prescribed duty ratios and/or the magnitudes of the respective one or more prescribed duty ratios may be derived by experiment or by other methods so that the actual degree of acceleration coincides or substantially coincides with the reference degree of acceleration regardless of the magnitude of the power-supply voltage.

The control circuit 31 includes the second calculator 46. The second calculator 46 calculates the first duty ratio DS. Specifically, the second calculator 46 sets the first duty ratio DS to the initial value when the motor 21 is started. The second calculator 46, after the motor 21 is started, increases the first duty ratio DS from the initial value to the desired duty ratio Dd in accordance with a lapse of time. Further, the second calculator 46, after the motor 21 is started, changes (or varies) the rate of increase based on the switching requirement being satisfied. Specifically, the second calculator 46 decreases the rate of increase based on the switching requirement being satisfied, as described above.

In other words, the second calculator 46 calculates the first duty ratio DS so that a degree of varying the rotational speed from when the motor 21 starts to rotate until the rotational speed reaches the desired rotational speed Rd is constant or substantially constant regardless of the magnitude of the power-supply voltage.

The control circuit 31 includes the drive command generator 47. The drive command generator 47 acquires the first duty ratio DS calculated in the second calculator 46. The drive command generator 47 further acquires the rotational position information. The drive command generator 47 further receives the direction setting signal Sd from the direction setting switch 10. The drive command generator 47 generates the drive command based on the first duty ratio DS, the rotational position information and the direction setting signal Sd. The drive command is output to the drive circuit 32.

Specifically, the drive command generator 47 detects the rotational position of the motor 21 (a rotation angle of the rotor 19, in detail) based on the rotational position information. The drive command generator 47 generates the drive command based on the detected rotational position so that the motor 21 rotates in the set rotation direction (that is, the rotation direction indicated by the direction setting signal Sd). At this time, the drive command generator 47 determines the ON hold switch and the PWM switch. The drive command includes the drive signal for the ON hold switch and the PWM drive signal for the PWM switch. The drive command generator 47 sets the first duty ratio DS calculated in the second calculator 46 to the duty ratio of the PWM drive signal.

The control circuit 31 includes a time counter (or time counting circuit, or timekeeper) 48. The time counter 48 measures an initial drive time period TE. The initial drive time period TE corresponds to a period of time elapsed from a measurement start timing. The measurement start timing corresponds to a timing at which the motor 21 is started. Specifically, the measurement start timing may be, for example, a timing at which manipulation of the trigger 8 is detected by the trigger detector 41. Also, for example, the measurement start timing may be a timing at which the drive command is output to the drive circuit 32 by the drive command generator 47 (in other words, when the control circuit 31 commands the drive circuit 32 to drive the motor 21). The initial drive time period TE will be referenced in a second embodiment.

2-1-4. Operation Example after the Motor is Started

An operation example of the motor 21 in a period from when the motor 21 is started until the rotational speed reaches the desired rotational speed Rd (hereinafter, referred to as "driving start transitional period") will be explained with reference to FIGS. 4 to 6.

First, a reference example will be explained referring to FIG. 4 in order to facilitate understanding of the features of the present disclosure. The reference example in FIG. 4 is an operation example of the motor 21 when the rate of increase of the first duty ratio DS is fixed. FIG. 4 shows, as one example, an operation example in which the value of the power-supply voltage Vb is VbL and an operation example when the value of the power-supply voltage Vb is VbH. VbH is greater than VbL. VbH may be, for example, a maximum value of the power-supply voltage Vb determined by specifications of the electric power tool 1 (maximum specification voltage). VbL may be, for example, a minimum value of the power-supply voltage Vb determined by the specifications of the electric power tool 1 (minimum specification voltage). In FIG. 4, "Rd" represents the desired rotational speed Rd.

The electric power tool 1 may be configured so that the motor 21 is driven even though the value of the power-supply voltage Vb exceeds VbH. Alternatively, the electric power tool 1 may be configured so that the motor 21 is not driven when the value of the power-supply voltage Vb exceeds VbH. The same applies to a case where the value of the power-supply voltage Vb is smaller than VbL.

When the power-supply voltage Vb is VbH, DdH is calculated and set as the desired duty ratio Dd. When the power-supply voltage Vb is VbL, DdL is calculated and set as the desired duty ratio Dd. DdL is greater than DdH. In other words, the desired duty ratio Dd is calculated in accordance with the magnitude of the power-supply voltage Vb so that the motor 21 rotates at the desired rotational speed Rd regardless of the magnitude of the power-supply voltage Vb.

At time t1, a drive requirement is satisfied, and thereby the motor 21 is started. When the motor 21 is started at time t1, the first duty ratio DS is set to the initial value. Then, the first duty ratio DS increases from the initial value to the desired duty ratio Dd in accordance with the rate of increase. Together with an increase of the first duty ratio DS, the rotational speed of the motor 21 also increases. A right side portion of FIG. 4 simply illustrates a waveform of the PWM drive signal and a waveform of a motor current near time t2. Time t2 is reached after the first duty ratio DS reaches the desired duty ratio Dd. The "motor current" corresponds to the electric current that flows through the motor 21.

The higher the power-supply voltage Vb, the lower the desired duty ratio Dd. Therefore, as illustrated in the right side portion of FIG. 4, when the power-supply voltage Vb is high, there may be a period during which the motor current is zero while the PWM switch is OFF. In other words, when the power-supply voltage Vb is high, the period during which the motor current is zero may repeatedly occur at a PWM cycle.

On the other hand, the lower the power-supply voltage Vb, the higher the desired duty ratio Dd. Therefore, as illustrated in the right side portion in FIG. 4, when the power-supply voltage Vb is low, the motor current decreases but continues to flow while the PWM switch is OFF.

Figure 4:
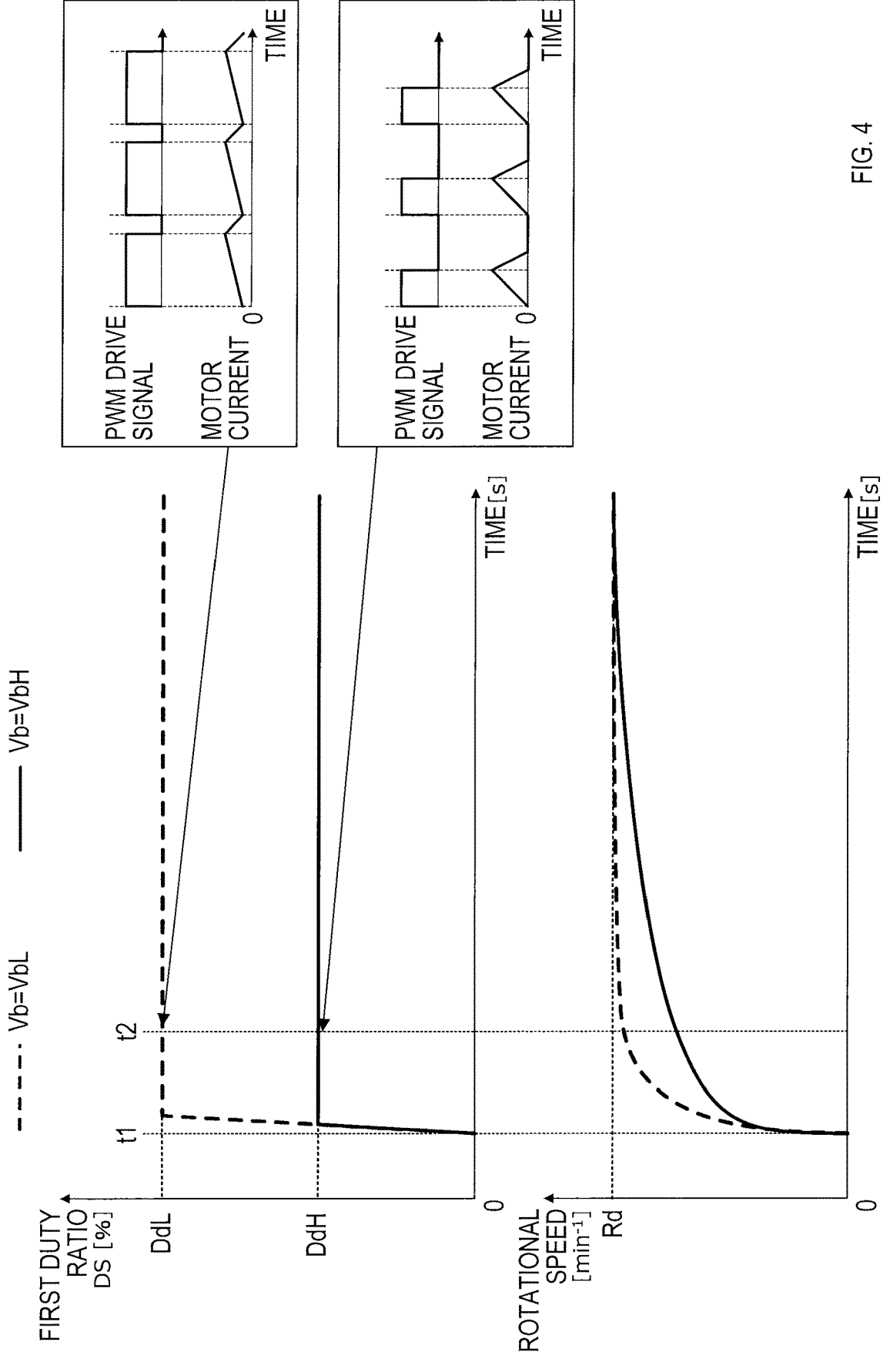
FIG. 4 is an explanatory diagram showing an operation example of a motor in the electric power tool with a fixed rate of increase of a first duty ratio.

Thus, as illustrated in FIG. 4, the increase of the rotational speed during the driving start transitional period is greater when the power-supply voltage Vb is lower as compared to when the power-supply voltage Vb is high. In other words, the degree of acceleration during the driving start transitional period varies deriving from the magnitude of the power-supply voltage Vb. The reason for the delay in rising of the rotational speed when the power-supply voltage Vb is high is that the motor current flows intermittently.

Immediately after the motor 21 is started (immediately after time t1), a load applied to the motor 21 is large, and thus the motor current is also large. Thus, although the first duty ratio DS is small, the motor current flows continuously. Thus, immediately after the motor 21 is started, variation in the degree of acceleration of the motor 21 deriving from the magnitude of the power-supply voltage Vb is small or almost none.

The first embodiment proposes a first method in which the variation in the degree of acceleration during the driving start transitional period can be reduced. The first method includes reducing the rate of increase based on the first duty ratio DS has reached the prescribed duty ratio Dp.

Figure 5:
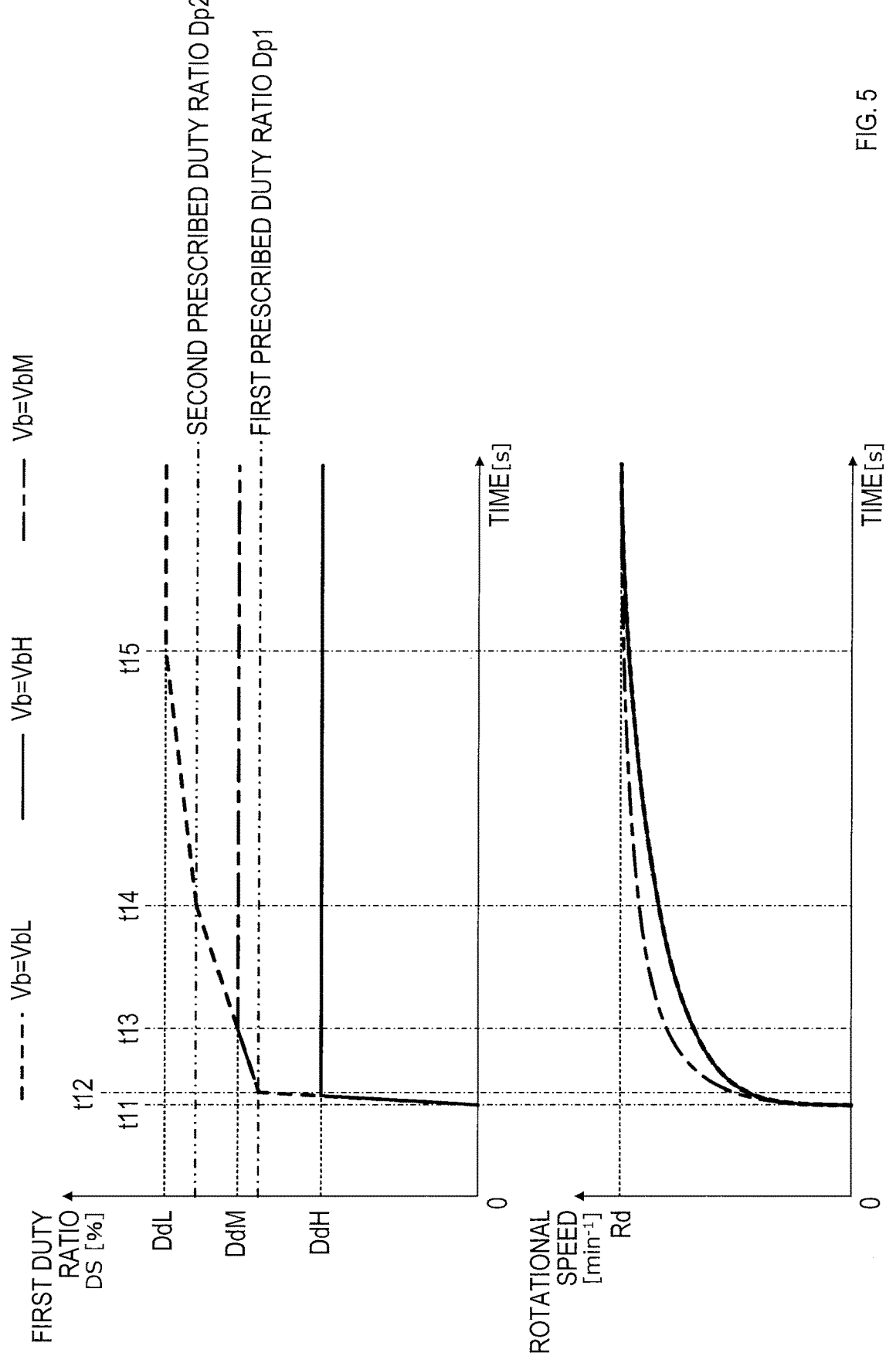
FIG. 5 is an explanatory diagram showing an operation example of the motor in the electric power tool to which a first method is applied.

Specifically, as illustrated in FIG. 5, one or more prescribed duty ratios Dp are set. FIG. 5 shows an example in which the first and the second prescribed duty ratios Dp1, Dp2 are set. In the first embodiment, the one or more prescribed duty ratios Dp are, for example, greater than or equal to the desired duty ratio DdH (or greater than the desired duty ratio DdH) and smaller or equal to the desired duty ratio DdL (or smaller than the desired duty ratio DdL).

The desired duty ratio DdH is set when the power-supply voltage Vb is the maximum specification voltage (for example, VbH). The desired duty ratio DdL is set when the power-supply voltage Vb is the minimum specification voltage (for example, VbL).

FIG. 5 shows not only an operation example when the value of the power-supply voltage Vb is VbL or VbH, but also an operation example when the value of the power-supply voltage Vb is VbM. VbM is smaller than VbH and greater than VbL. When the power-supply voltage Vb is VbM, DdM is calculated and set as the desired duty ratio Dd. DdM is greater than DdH and smaller than DdL. In other words, the desired duty ratio DdM is calculated so that the motor 21 rotates at the desired rotational speed Rd when the power-supply voltage Vb is VbM.

In the example of FIG. 5, after the motor 21 is started at time t11, the first duty ratio DS increases from the initial value in accordance with the first rate of increase Pi1. In FIG. 5, the first duty ratio DS and the degree of varying the rotational speed when the power-supply voltage Vb is VbH are the same as those in FIG. 4.

On the other hand, when the power-supply voltage Vb is VbL, the first duty ratio DS reaches the first prescribed duty ratio Dp1 at time t12. In other words, the switching requirement is satisfied. This reduces the rate of increase of the first duty ratio DS from the first rate of increase Pi1 to the second rate of increase Pi2. In other words, the increase of the first duty ratio DS becomes moderate after time t12. The first duty ratio DS reaches the second prescribed duty ratio Dp2 at time t14. In other words, the switching requirement is satisfied. This further reduces the rate of increase from the second rate of increase Pi2 to the third rate of increase Pi3. In other words, the increase of the first duty ratio DS becomes more moderate after time t14. The first duty ratio DS reaches the desired duty ratio DdL at time t15. As a result, as illustrated in FIG. 5, the rotational speed during the driving start transitional period in a case where the power-supply voltage Vb is VbL coincides or substantially coincides with a case where the power-supply voltage Vb is VbH. In other words, the variation in the degree of acceleration deriving from the magnitude of the power-supply voltage Vb is reduced.

However, as illustrated in FIG. 5, the degree of acceleration is different in a case where the power-supply voltage Vb is VbM. In this case, the first duty ratio DS reaches the first prescribed duty ratio Dp1 at time t12. In other words, the switching requirement is satisfied. This reduces the rate of increase from the first rate of increase Pi1 to the second rate of increase Pi2. Thereafter, at time t13, the first duty ratio DS reaches the desired duty ratio DdM.

As above, in the first method, the variation in the degree of acceleration deriving from the magnitude of the power-supply voltage Vb can be reduced, but there is still room for improvement.

The first embodiment further proposes a second method for reducing the variation in the degree of acceleration. By further adopting the second method in addition to the first method, the variation in the degree of acceleration can be reduced. The second method includes varying (or changing) the aforementioned prescribed duty ratio Dp in accordance with the power-supply voltage Vb.

Figure 6:
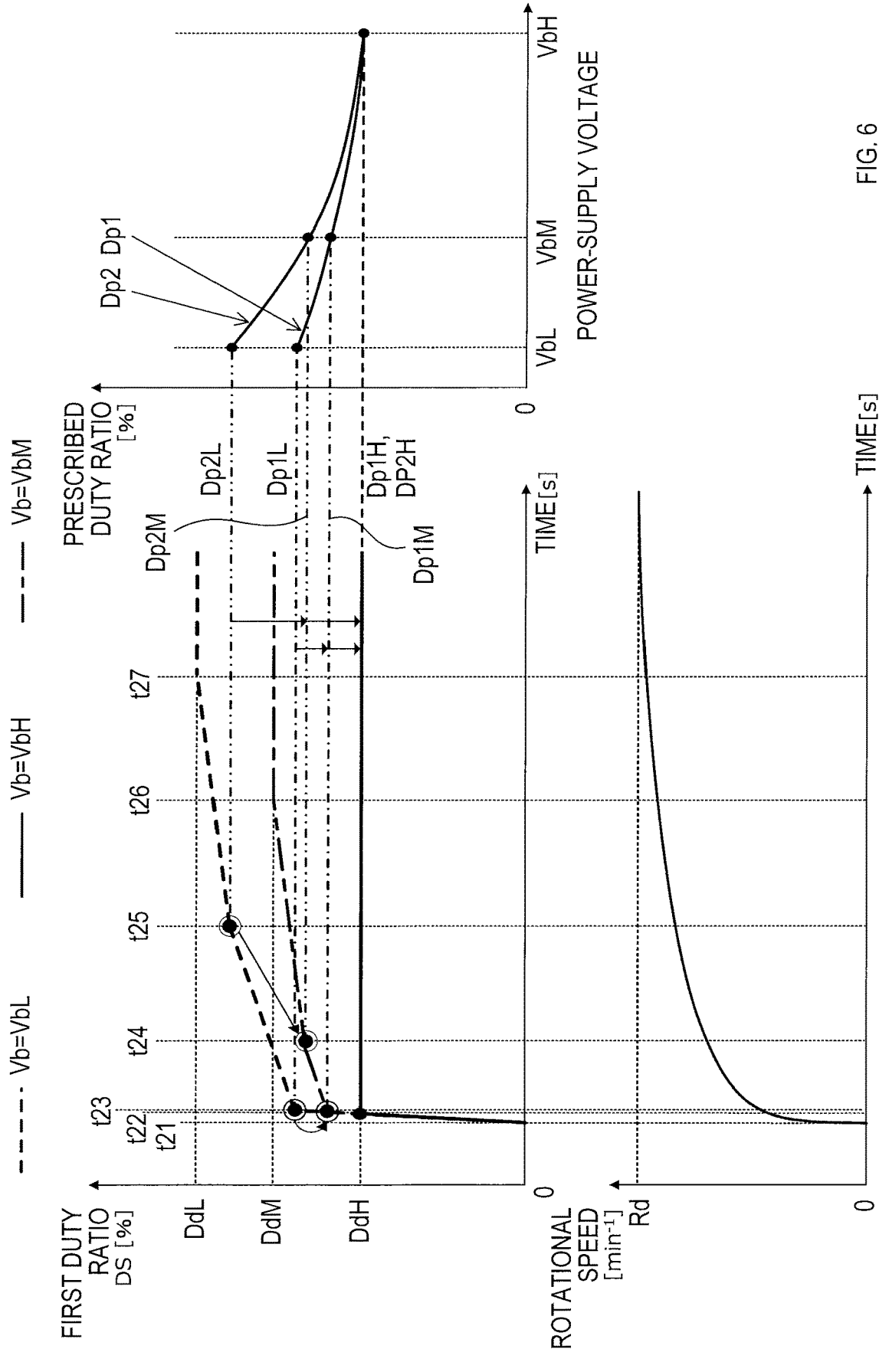
FIG. 6 is an explanatory diagram showing an operation example of the motor in the electric power tool of the first embodiment to which the first method and a second method are applied.

Specifically, as illustrated in FIG. 6, each of the first and second prescribed duty ratios Dp1, Dp2 is reduced in accordance with the increase of the power-supply voltage Vb. Specifically, as for the first prescribed duty ratio Dp1, (i)

Dp1H is set as Dp1 when the power-supply voltage Vb is VbH, (ii) Dp1M is set as Dp1 when the power-supply voltage Vb is VbM, and (iii) Dp1L is set as Dp1 when the power-supply voltage Vb is VbL. Dp1M is greater than Dp1H, and Dp1L is greater than Dp1M. As for the second prescribed duty ratio Dp2, (i) Dp2H is set as Dp2 when the power-supply voltage Vb is VbH, (ii) Dp2M is set as Dp2 when the power-supply voltage Vb is VbM, and (iii) Dp2L is set as Dp2 when the power-supply voltage Vb is VbL. Dp2M is greater than Dp2H, and Dp2L is greater than Dp2M.

As a result, in the example of FIG. 6, the higher the power-supply voltage Vb, the earlier the timing at which the first duty ratio DS reaches the first prescribed duty ratio Dp1. Also, the higher the power-supply voltage Vb, the earlier the timing at which the first duty ratio DS reaches the second prescribed duty ratio Dp2.

In FIG. 6, the drive requirement is satisfied at time t21, and thereby the motor 21 is started. For example, when the power-supply voltage Vb is VbL, the first duty ratio DS reaches the first prescribed duty ratio Dp1L at time t23, the first duty ratio DS reaches the second prescribed duty ratio Dp2L at time t25, and the first duty ratio DS reaches the desired duty ratio DdL at time t27.

In contrast, when the power-supply voltage Vb is VbM, the first duty ratio DS reaches the first prescribed duty ratio Dp1M at time t22, the first duty ratio DS reaches the second prescribed duty ratio Dp2M at time t24, and the first duty ratio DS reaches the desired duty ratio DdM at time t26. Time t22 is earlier than time t23, and time t24 is earlier than time t25. In other words, the higher the power-supply voltage Vb, the earlier the timing at which the rate of increase is switched (that is, at which the rate of increase is reduced).

As a result, as illustrated in FIG. 6, the rotational speeds during the driving start transitional period when the power-supply voltage Vb is VbH, VbM and VbL coincide or substantially coincide with each other. In other words, use of both the first and second methods further reduces the variation in the degree of acceleration deriving from the magnitude of the power-supply voltage Vb.

The prescribed duty ratio Dp may be set in any manner. The control circuit 31, for example, may have a setting formula or a setting table. The setting formula and the setting table each represent a correspondence between the prescribed duty ratio Dp and the magnitude (or value) of the power-supply voltage Vb. The control circuit 31 may calculate the prescribed duty ratio Dp by plugging the value of the power-supply voltage Vb detected by the voltage detector 43 into the corresponding formula. Alternatively, the control circuit 31 may acquire the prescribed duty ratio Dp corresponding to the value of the power-supply voltage Vb detected by the voltage detector 43 by referring to the corresponding table.

The prescribed duty ratio Dp may be set as well when the value of power-supply voltage Vb exceeds VbH and/or the value of the power-supply voltage Vb is smaller than VbL.

For example, a graph in the right side portion of FIG. 6 shows the correspondence between the power-supply voltage Vb and the prescribed duty ratio Dp. In this graph, even if the power-supply voltage Vb exceeds VbH, both the first prescribed duty ratio Dp1 and the second prescribed duty ratio Dp2 may continuously vary (that is, decrease). Also in a range where the power-supply voltage Vb is smaller than VbL, both the first prescribed duty ratio Dp1 and the second prescribed duty ratio Dp2 may continuously vary (that is, increase).

Alternatively, in a range where the power-supply voltage Vb exceeds VbH, the first prescribed duty ratio Dp1 may remain the first prescribed duty ratio Dp1H when the power-supply voltage Vb is VbH. Similarly, in the range where the power-supply voltage Vb is smaller than VbL, the first prescribed duty ratio Dp1 may remain the first prescribed duty ratio Dp1L when the power-supply voltage Vb is VbL. The same applies to the second prescribed duty ratio Dp2.

2-1-5. Motor Control Process

Figure 7:
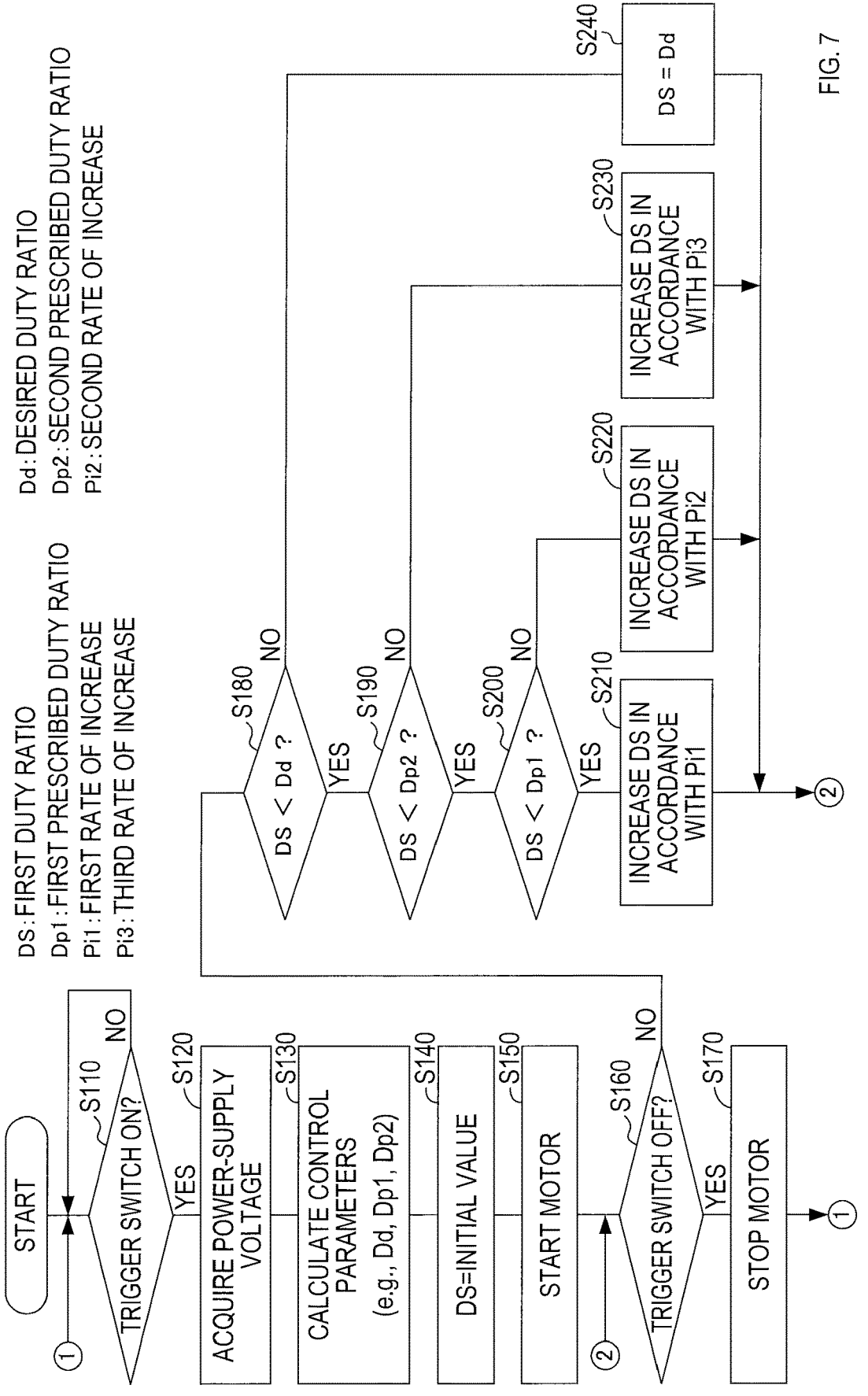
FIG. 7 is a flowchart of a motor control process of the first embodiment.

Referring to FIG. 7, the motor control process will be explained. The motor control process is executed by the control circuit 31 (in detail, the CPU 31*a*). The aforementioned various operations of the control circuit 31 are implemented by executing the motor control process. The control circuit 31 executes the motor control process in response to the control circuit 31 being activated.

The control circuit 31 determines in S110 whether the trigger switch 15*a* is turned ON (and whether the trigger 8 is manipulated). The process of S110 corresponds to the process executed by the trigger detector 41. While the trigger switch 15*a* is OFF, the control circuit 31 repeats the process of S110.

When the trigger switch 15*a* is ON, the control circuit 31 acquires the magnitude of the power-supply voltage Vb in S120. In other words, the control circuit 31, before driving the motor 21, acquires the magnitude of the power-supply voltage Vb. The process of S120 corresponds to the process executed by the voltage detector 43.

In S130, the control circuit 31 calculates control parameters based on the magnitude of the power-supply voltage Vb acquired in S120. The control parameters include the desired duty ratio Dd, the first prescribed duty ratio Dp1, and the second prescribed duty ratio Dp2: The process of S130 corresponds to the process executed by the first calculator 44 and the requirement setter 45.

In S140, the control circuit 31 sets the first duty ratio DS to the initial value. The process of S140 corresponds to the process executed by the second calculator 46.

In S150, the control circuit 31 starts the motor 21. Specifically, the control circuit 31 outputs the drive command to the drive circuit 32 and thereby drives the motor 21. The drive command output at this time includes the PWM drive signal. The PWM drive signal has the first duty ratio DS set in S140.

In S160, the control circuit 31 determines whether the trigger switch 15*a* is turned OFF. When the trigger switch 15*a* is turned OFF, the control circuit 31 stops the motor 21 in S170. Specifically, for example, the control circuit 31 stops outputting the drive command. After the process of S170, the present process moves to S110.

In S160, when the trigger switch 15*a* is ON, the present process moves to S180. In S180, the control circuit 31 determines whether the current (that is, currently calculated) first duty ratio DS is smaller than the desired duty ratio Dd. When the current first duty ratio DS reaches the desired duty ratio Dd, the present process moves to S240. In S240, the control circuit 31 sets the first duty ratio DS to the desired duty ratio Dd. In other words, the first duty ratio DS remains the desired duty ratio Dd. After S240, the present process moves to S160.

In S180, when the first duty ratio DS is smaller than the desired duty ratio Dd, the present process moves to S190. In S190, the control circuit 31 determines whether the current first duty ratio DS is less than the second prescribed duty ratio Dp2. When the current first duty ratio DS is the second prescribed duty ratio Dp2 or more, the present process moves to S230. In S230, the control circuit 31 increases the first duty ratio DS in accordance with the third rate of increase Pi3. After S230, the present process moves to S160.

In S190, when the first duty ratio DS is smaller than the second prescribed duty ratio Dp2, the present process moves to S200. In 8200, the control circuit 31 determines whether the current first duty ratio DS is less than the first prescribed duty ratio Dp1. When the current first duty ratio DS is the first prescribed duty ratio Dp1 or more, the present process moves to S220. In S220, the control circuit 31 increases the first duty ratio DS in accordance with the second rate of increase Pi2. After S220, the present process moves to S160.

When the first duty ratio DS is smaller than the first prescribed duty ratio Dp1 in S200, the present process moves to S210. In S210, the control circuit 31 increases the first duty ratio DS in accordance with the first rate of increase Pi1. After S210, the present process moves to S160.

Due to the execution of the motor control process as above, the motor 21 is controlled during the driving start transitional period as illustrated in FIG. 6. This reduces the variation in the degree of acceleration deriving from the magnitude of the power-supply voltage Vb.

2-1-6. Correspondence of Terms

The drive command generator 47 corresponds to one example of the drive signal generator in Overview of Embodiments. The trigger 8 corresponds to one example of the manual switch in Overview of Embodiments. Determination in S110 that the trigger switch 15a is ON corresponds to one example of the drive requirement being satisfied in Overview of Embodiments. Varying the first duty ratio DS when the power-supply voltage Vb is VbL (see a broken line), varying the first duty ratio DS when the power-supply voltage Vb is VbM (see a dash-dotted line), and varying the first duty ratio DS when the power-supply voltage Vb is VbH (see a solid line) in FIG. 6 all correspond to one example of the first profile in Overview of Embodiments. Varying the rotational speed until reaching the desired rotational speed Rd in FIG. 6 corresponds to one example of the first speed trajectory in Overview of Embodiments.

2-2. Second Embodiment

In a second embodiment, another example of the switching requirement will be explained with reference to FIGS. 8 and 9. The electric power tool 1 of the second embodiment is configured basically in the same manner as the electric power tool 1 of the first embodiment except for the switching requirement.

In the second embodiment, the switching requirement is satisfied each time the aforementioned initial drive time period reaches respective one or more prescribed time periods Tp. In the second embodiment, the one or more prescribed time periods Tp include a first prescribed time period Tp1 and the second prescribed time period Tp2.

Specifically, in the second embodiment, the requirement setter 45 calculates the first prescribed time period Tp1 and the second prescribed time period Tp2. The second prescribed time period Tp2 is longer than the first prescribed time period Tp1. Accordingly, after the motor 21 is started, when the initial drive time period reaches the first prescribed time period Tp1, the switching requirement is satisfied. Thereafter, when the initial drive time period reaches the second prescribed time period Tp2, the switching requirement is again satisfied.

The requirement setter 45 of the second embodiment further varies the aforementioned respective one or more prescribed time periods Tp in accordance with the magnitude of the power-supply voltage Vb. Specifically, as illustrated in a right side portion of FIG. 8, the requirement setter 45 calculates the one or more prescribed time periods Tp so that the higher the power-supply voltage Vb, the shorter the respective one or more prescribed time periods Tp (in the second embodiment, the first and second prescribed time periods Tp1, Tp2). The one or more prescribed time periods Tp may be determined in any manner. The one or more prescribed time periods Tp may be, for example, determined by experiment in the same manner as the prescribed duty ratio Dp of the first embodiment.

An operation example of the motor 21 of the second embodiment will be explained with reference to FIG. 8. As illustrated in FIG. 8, each of the first and second prescribed time periods Tp1, Tp2 is set shorter as the power-supply voltage Vb is higher. Specifically, for the first prescribed time period Tp1, (i) when the power-supply voltage Vb is VbH, Tp1H is set as Tp1, (ii) when the power-supply voltage Vb is VbM, Tp1M is set as Tp1, and (iii) when the power-supply voltage Vb is VbL, Tp1L is set as Tp1. Tp1M is longer than Tp1H, and Tp1L is longer than Tp1M. For the second prescribed time period Tp2 as well, (i) when the power-supply voltage Vb is VbH, Tp2H is set as Tp2, (ii) when the power-supply voltage Vb is VbM, Tp2M is set as Tp2, and (iii) when the power-supply voltage Vb is VbL, Tp2L is set as Tp2. Tp2M is longer than Tp2H, and Tp2L is longer than Tp2M.

Figure 8:
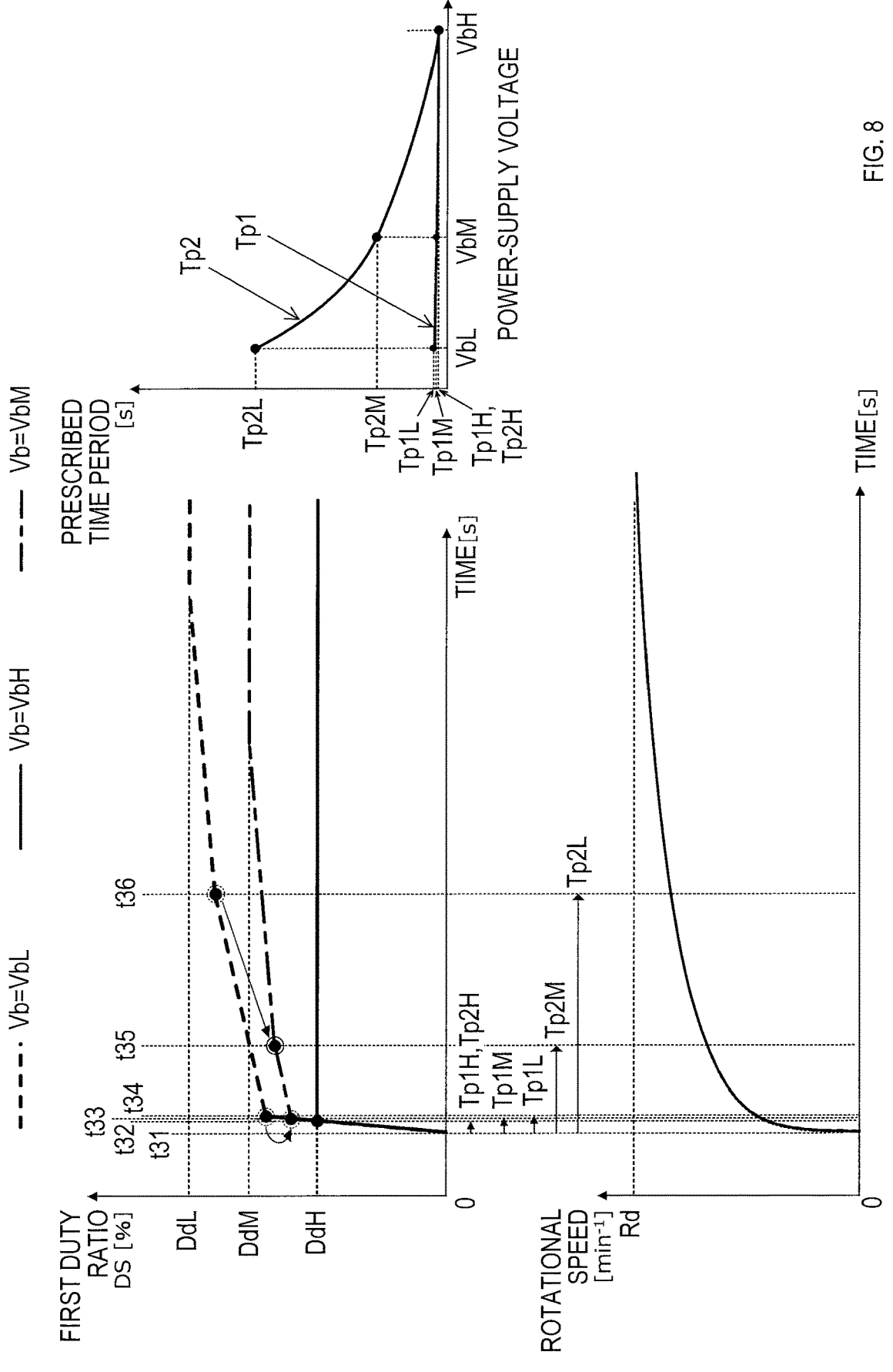
FIG. 8 is an explanatory diagram showing an operation example of the motor in the electric power tool of a second embodiment.

As a result, in the example of FIG. 8, the higher the power-supply voltage Vb, the earlier the timing at which the initial drive time period reaches the first prescribed time period Tp1. The higher the power-supply voltage Vb, the earlier the timing at which the initial drive time period reaches the second prescribed time period Tp2. In FIG. 8, time t31 corresponds to the measurement start timing of the initial drive time period.

For example, when the power-supply voltage Vb is VbL, the first prescribed time period Tp1L elapses from the measurement start timing at time t34, and the second pre-scribed time period Tp2L. elapses from the measurement start timing at time t36. At time t34, the rate of increase of the first duty ratio DS is switched from the first rate of increase Pi1 to the second rate of increase Pi2. At time t36, the rate of increase is switched from the second rate of increase Pi2 to the third rate of increase Pi3.

In contrast, when the power-supply voltage Vb is VbM, the first prescribed time period Tp1M elapses from the measurement start timing at time t33, and the second pre-scribed time period Tp2M elapses from the measurement start timing at time t35. At time t33, the rate of increase of the first duty ratio DS is switched from the first rate of increase Pi1 to the second rate of increase Pi2. At time t35, the rate of increase is switched from the second rate of increase Pi2 to the third rate of increase Pi3.

Time t33 is earlier than time t34, and time t35 is earlier than time t36. In other words, the higher the power-supply voltage Vb, the earlier the timing at which the rate of increase is switched (that is, at which the rate of increase is reduced).

As a result, as illustrated in FIG. 8, the rotational speeds during the driving start transitional period when the power-supply voltage Vb is VbH, VbM and VbL coincide or substantially coincide with each other. In other words, the variation in the degree of acceleration deriving from the magnitude of the power-supply voltage Vb is further reduced as in the first embodiment.

Figure 9:
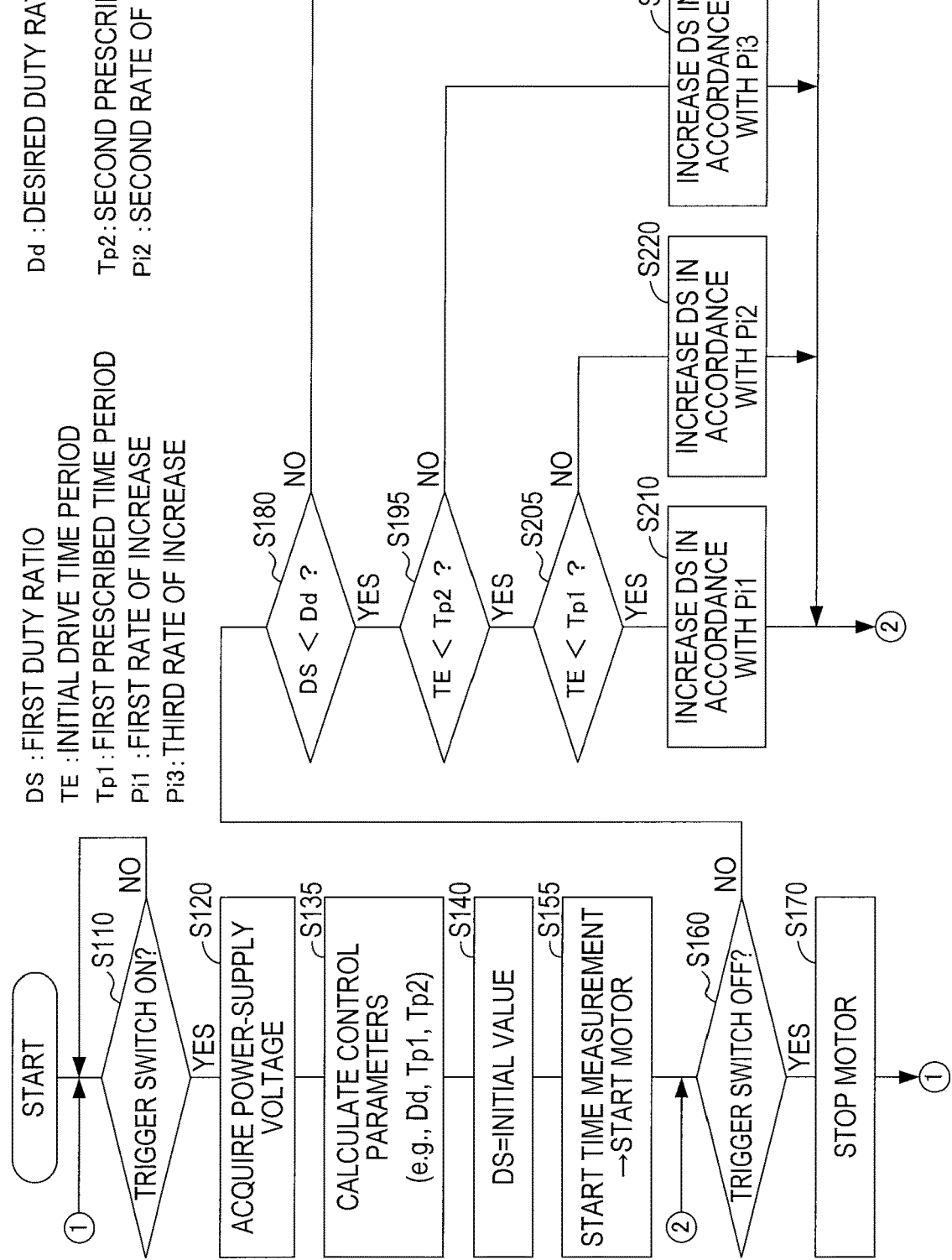
FIG. 9 is a flowchart of a motor control process of the second embodiment.

Referring to FIG. 9, the motor control process of the second embodiment will be explained. The control circuit 31 executes the motor control process of FIG. 9, and thereby an operation as illustrated in FIG. 8 is implemented. In FIG. 9, the same steps as those in motor control process of the first embodiment (see FIG. 7) are denoted with the same reference numerals as those in FIG. 7, and detailed descriptions thereof are omitted.

In the motor control process of FIG. 9, after the magnitude of the power-supply voltage Vb is acquired in S120, the process moves to S135. In S135, the control circuit 31 calculates the control parameters based on the magnitude of the power-supply voltage Vb detected in S120. The control parameters calculated in S135 includes the desired duty ratio Dd, the first prescribed time period Tp1, and the second prescribed time period Tp2. The process of S135 corresponds to the process executed by the first calculator 44 and the requirement setter 45. After S135, the present process moves to S140.

After the first duty ratio DS is set to the initial value in S140, the present process moves to S155. In S155, the control circuit 31 starts to measure the initial drive time period TE. In other words, the timing at which S155 is executed corresponds to the aforementioned measurement start timing. In S155, the motor 21 is started as in S150 of FIG. 7.

In S180, when the current first duty ratio DS is smaller than the desired duty ratio Dd, the present process moves to S195. In S195, the control circuit 31 determines whether the initial drive time period TE is less than the second prescribed time period Tp2. When the initial drive time period TE is the second prescribed time period Tp2 or more, the present process moves to S230. In S230, the control circuit 31 increases the first duty ratio DS in accordance with the third rate of increase Pi3. When the initial drive time period TE is less than the second prescribed time period Tp2, the present process moves to S205.

In S205, the control circuit 31 determines whether the initial drive time period TE is less than the first prescribed time period Tp1. When the initial drive time period TE is the first prescribed time period Tp1 or more, the present process moves to S220. In S220, the control circuit 31 increases the first duty ratio DS in accordance with the second rate of increase Pi2. When the initial drive time period TE is less the first prescribed time period Tp1, the present process moves to S210. In S210, the control circuit 31 increases the first duty ratio DS in accordance with the first rate of increase Pi1.

Due to the execution of the motor control process as above, the motor 21 is controlled during the driving start transitional period as illustrated in FIG. 8. This reduces the variation in the degree of acceleration deriving from the magnitude of the power-supply voltage Vb as in the first embodiment.

2-3. Third Embodiment

The third embodiment proposes further adding a third method to the first embodiment. Specifically, the third method includes varying (or changing) at least one of the first to third rates of increase Pi1 to Pi3 in accordance with the magnitude of the power-supply voltage Vb. In the third embodiment, all of the first to third rates of increase Pi1 to Pi3 are varied in accordance with the magnitude of the power-supply voltage Vb.

Figure 10:
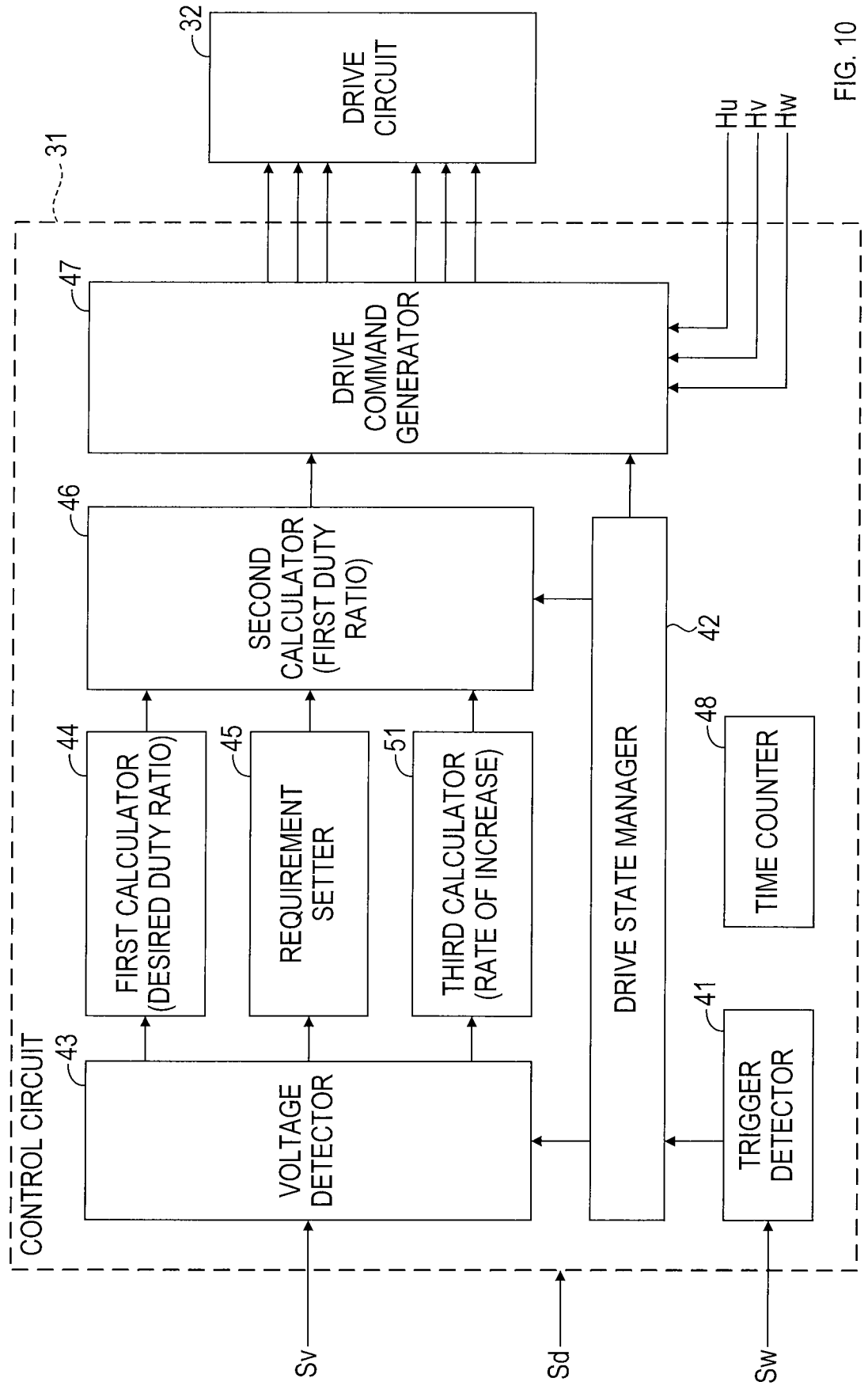
FIG. 10 is a block diagram showing a function of a control circuit of a third embodiment.

The control circuit 31 of the third embodiment, as shown in FIG. 10, further includes a third calculator 51. The third calculator 51 calculates the first to third rates of increase Pi1 to Pi3 based on the magnitude of the power-supply voltage Vb detected by the voltage detector 43. Specifically, the third calculator 51 calculates the first to third rates of increase Pi1 to Pi3 as illustrated in a lower right portion in FIG. 11. The first to third rates of increase Pi1 to Pi3 are each calculated so that the higher the power-supply voltage Vb, the lower the first to third rates of increase Pi1 to Pi3.

The first to third rates of increase Pi1 to Pi3 may be calculated in any specific manner based on the magnitude of the power-supply voltage Vb. For example, the first rate of increase Pi may be calculated so that a product of the first rate of increase Pi and the power-supply voltage Vb is a constant value. The same applies to the second and third rates of increase Pi2, Pi3.

An operation example of the motor 21 of the third embodiment will be explained with reference to FIG. 11. The operation example of FIG. 11 is basically the same as the operation example of the first embodiment shown in FIG. 6 except that each of the first to third rates of increase Pi1 to Pi3 varies in accordance with the magnitude of the power-supply voltage Vb.

Figure 11:
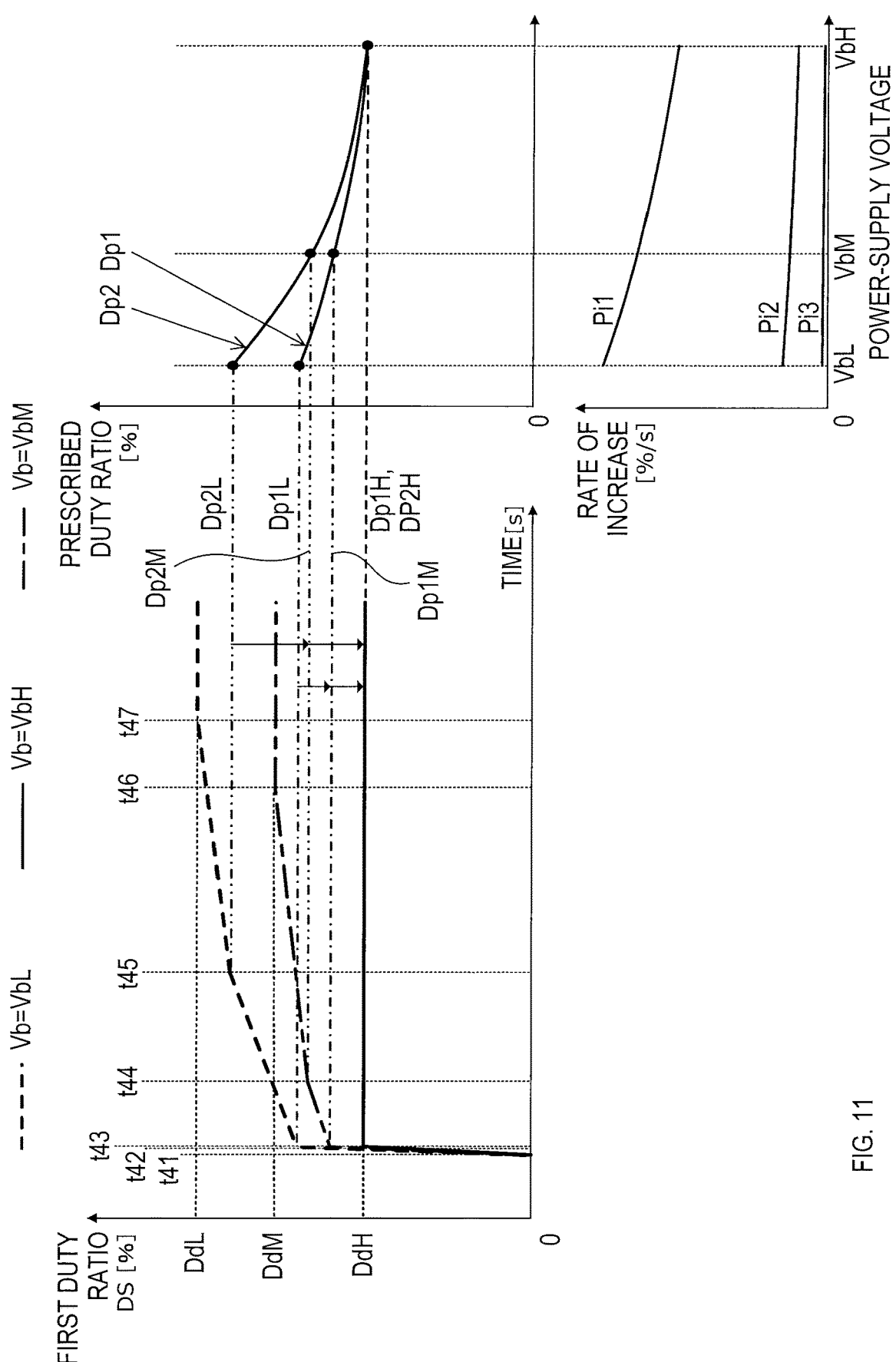
FIG. 11 is an explanatory diagram showing an operation example of a motor in an electric power tool of the third embodiment.

In FIG. 11, the motor 21 is started at time t41. The first rate of increase Pi1 after time t41 varies (or changes) in accordance with the power-supply voltage Vb (in detail, in accordance with the power-supply voltage Vb detected at time t41). Specifically, the higher the power-supply voltage Vb at time t41, the lower the first rate of increase Pi1.

For example, a case where the power-supply voltage Vb is VbL will be described. In this case, the first duty ratio DS reaches the first prescribed duty ratio Dp1L at time t43. This switches the rate of increase of the first duty ratio DS to the second rate of increase Pi2. The second rate of increase Pi2 also varies in accordance with the power-supply voltage Vb at time t41. The power-supply voltage Vb may be acquired at time t43, and the second rate of increase Pi2 may be set in accordance with the power-supply voltage Vb. The first duty ratio DS reaches the second prescribed duty ratio Dp2L at time t45. This switches the rate of increase to the third rate of increase Pi3. The third rate of increase Pi3 also varies in accordance with the power-supply voltage Vb at time t41. The power-supply voltage Vb may be acquired at time t45, and the third rate of increase Pi3 may be set in accordance with the power-supply voltage Vb.

When the power-supply voltage Vb is VbM, the first duty ratio DS reaches the first prescribed duty ratio Dp1M at time t42. This switches the rate of increase to the second rate of increase Pi2. The second rate of increase Pi2 also varies in accordance with the power-supply voltage Vb. Specifically, the second rate of increase Pi2 at the time is lower than the second rate of increase Pi2 when the power-supply voltage Vb is VbL. The first duty ratio DS reaches the second prescribed duty ratio Dp2M at time t44. This switches the rate of increase to the third rate of increase Pi3. The third rate of increase Pi3 also varies in accordance with the power-supply voltage Vb. Specifically, the third rate of increase Pi3 at the time is lower than the third rate of increase Pi3 when the power-supply voltage Vb is VbL.

As a result, although not shown in FIG. 11, variation in the rotational speed during the driving start transitional period is reduced as compared to the variation in the rotational speed shown in FIG. 6.

Figure 12:
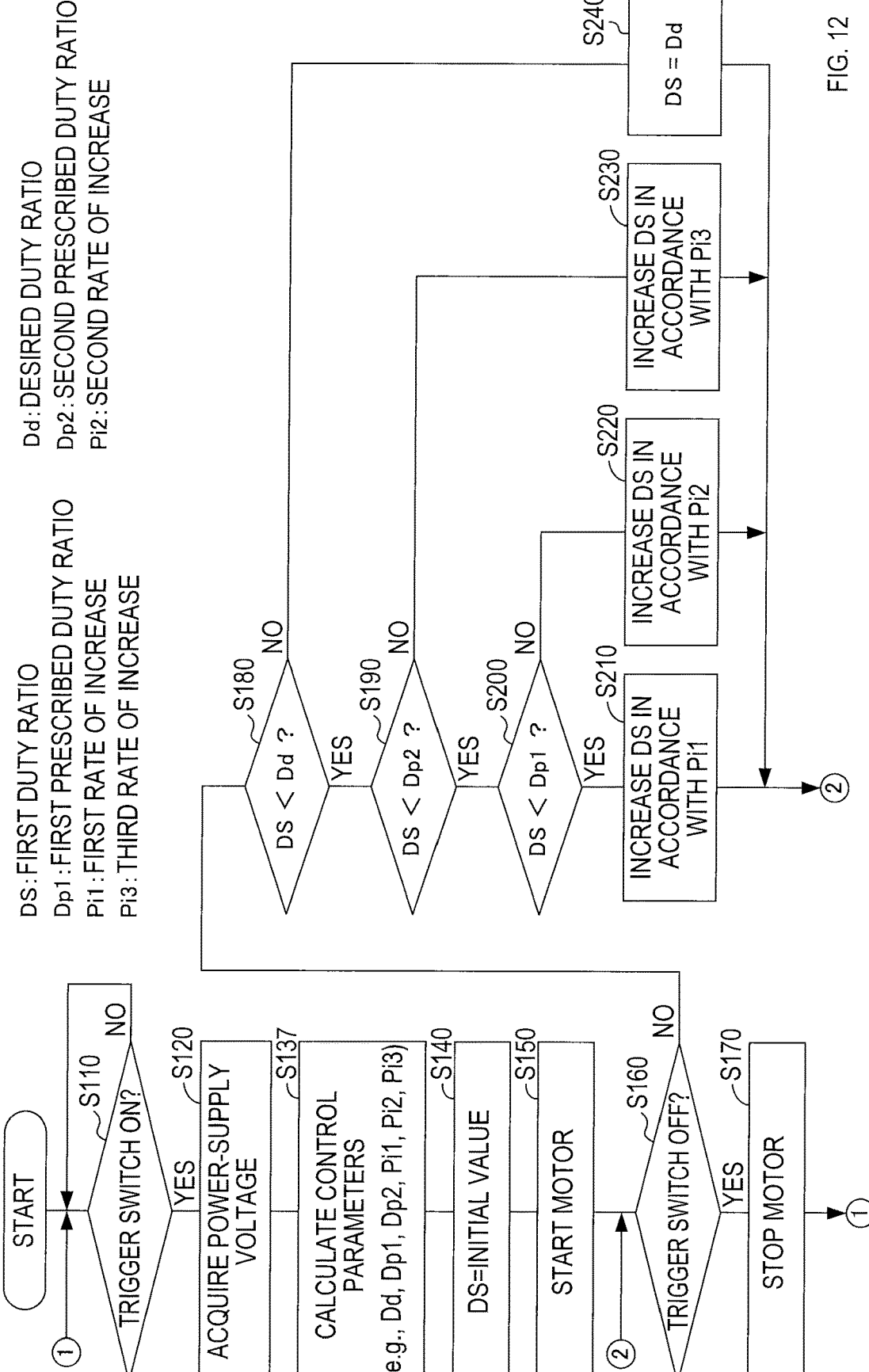
FIG. 12 is a flowchart of a motor control process of the third embodiment.

Referring to FIG. 12, the motor control process of the third embodiment will be described. The control circuit 31 executes the motor control process of FIG. 12, and thereby an operation as illustrated in FIG. 11 is implemented. In FIG. 12, the same steps of the motor control process of the first embodiment (see FIG. 7) are denoted with the same reference numerals as those in FIG. 7, and detailed descriptions thereof are omitted.

As is clear from comparison between FIG. 12 and FIG. 7, the motor control process of FIG. 12 differs from that of FIG. 7 in that instead of the process of S130 of FIG. 7, a process of S137 is executed. Specifically, in the third embodiment, after the magnitude of the power-supply voltage Vb is acquired in S120, the present process moves to S137. In S137, the control circuit 31 calculates the control parameters. Specifically, the control circuit 31 calculates the desired duty ratio Dd, the first prescribed duty ratio Dp1, the second prescribed duty ratio Dp2, and the first to third rates of increase Pi1 to Pi3. The control circuit 31 calculates the first to third rates of increase Pi1 to Pi3 based on the magnitude of the power-supply voltage Vb acquired in S120. The first to third rates of increase Pi1 to Pi3 calculated in S137 are used in S210, S220, and S230.

The third method can be added to the second embodiment.

2-4. Other Embodiments

The embodiments of the present disclosure have been described above. However, the present disclosure is not limited to the above-described embodiments and can be practiced with various modifications.

(1) In the first and second embodiments, the rate of increase of the first duty ratio DS is switched in a maximum of two stages. However, the rate of increase may be switched at a maximum of one stage, or of three stages or more.

Specifically, in the first embodiment, for example, only one prescribed duty ratio Dp may be set. In this case, the rate of increase of the first duty ratio DS is switched at maximum once. Also, for example, three or more prescribed duty ratios Dp may be set. In this case, the rate of increase of the first duty ratio DS is switched up to the number of the set prescribed duty ratios Dp.

In the second embodiment, for example, only one prescribed time period Tp may be set. In this case, the rate of increase of the first duty ratio DS is switched at maximum once. Also, for example, three or more prescribed time periods Tp may be set. In this case, the rate of increase of the first duty ratio DS is switched up to the number of the set prescribed time periods.

(2) In each of the above-described embodiments, the desired rotational speed Rd is determined in advance. However, the desired rotational speed Rd may be varied in accordance with the moving amount (or pulling amount) of the trigger 8.

For example, the electric power tool 1 may include a moving amount output circuit configured to output a signal that indicates the moving amount of the trigger 8. The control circuit 31 may detect the moving amount of the trigger 8 based on the signal from the moving amount output circuit. The control circuit 31 may set the desired rotational speed Rd in accordance with the detected moving amount. Specifically, the control circuit 31 may set the desired rotational speed Rd so that the greater the moving amount, the higher the desired rotational speed Rd.

(3) The voltage detector 43 may detect the magnitude of the power-supply voltage Vb at any time (for example, periodically in a control cycle). Each time the magnitude of the power-supply voltage Vb is detected, the first calculator 44 may update (or recalculate) the desired duty ratio Dd based on the new magnitude of the power-supply voltage Vb detected. Each time the magnitude of the power-supply voltage Vb is detected, the requirement setter 45 also may update (or reset) the switching requirement based on the new magnitude of the power-supply voltage Vb detected.

(4) A plurality of functions of one element of the aforementioned embodiments may be performed by a plurality of elements, and one function of one element may be performed by a plurality of elements. A plurality of functions of a plurality of elements may be performed by one element, and one function performed by a plurality of elements may be performed by one element. Part of the configurations of the aforementioned embodiments may be omitted. At least part of the configurations of the aforementioned embodiments may be added to or replaced with the configurations of the other above-described embodiments.

What is claimed is:

1. An electric power tool comprising:
a grip configured to be gripped by a user of the electric power tool;
a trigger configured to be manually moved by the user;
a motor;
a chuck sleeve configured to be driven by the motor, the chuck sleeve being configured to detachably receive a tool bit;
a battery configured to supply a power-supply voltage;
a drive circuit configured (i) to receive the power-supply voltage from the battery, and (ii) to receive a drive command, the drive command commanding the drive circuit to drive the motor, the drive command including a drive signal, the drive signal being in the form of a pulse-width modulation signal having a first duty ratio, the drive circuit being configured to apply the power-supply voltage to the motor in accordance with the first duty ratio to drive the motor;
a voltage detector configured to detect a magnitude of the power-supply voltage based on the trigger being manually moved, the voltage detector being configured to detect the magnitude of the power-supply voltage before the drive signal is input to the drive circuit;
a first calculator configured to calculate a desired duty ratio based on the magnitude of the power-supply voltage detected by the voltage detector;
a second calculator configured to calculate the first duty ratio based on the trigger being manually moved, the second calculator being configured to increase the first duty ratio from an initial value to the desired duty ratio in accordance with a lapse of time, the second calculator being configured to vary a rate of increase of the first duty ratio based on the magnitude of the power-supply voltage detected by the voltage detector; and
a drive command generator configured to output the drive command to the drive circuit based on the trigger being manually moved, the drive signal in the drive command having the first duty ratio calculated by the second calculator.

2. An electric power tool comprising:
a motor;
a drive circuit configured to receive a power-supply voltage and a drive signal, the drive signal being in the form of a pulse-width modulation signal having a first duty ratio, the drive circuit being configured to apply the power-supply voltage to the motor in accordance with the first duty ratio to drive the motor;
a voltage detector configured to detect a magnitude of the power-supply voltage;
a first calculator configured to calculate a desired duty ratio based on the magnitude of the power-supply voltage detected by the voltage detector; and
a second calculator configured to calculate the first duty ratio, the second calculator being configured to increase the first duty ratio from an initial value to the desired duty ratio in accordance with a lapse of time, the second calculator being configured to vary a rate of increase of the first duty ratio based on the magnitude of the power-supply voltage detected by the voltage detector.

3. The electric power tool according to claim 2, wherein the second calculator is configured to decrease the rate of increase based on a switching requirement being satisfied, the switching requirement being required for decreasing the rate of increase.

4. The electric power tool according to claim 3, further comprising:

a requirement setter configured to set the switching requirement based on the magnitude of the power-supply voltage detected by the voltage detector.

5. The electric power tool according to claim 3, wherein the switching requirement is satisfied based on the first duty ratio calculated by the second calculator having reached a first prescribed duty ratio.

6. The electric power tool according to claim 4, wherein the requirement setter is configured to calculate a first prescribed duty ratio based on the magnitude of the power-supply voltage detected by the voltage detector, and the switching requirement is satisfied based on the first duty ratio calculated by the second calculator having reached the first prescribed duty ratio.

7. The electric power tool according to claim 6, wherein the requirement setter is configured to decrease the first prescribed duty ratio as the power-supply voltage detected by the voltage detector increases.

8. The electric power tool according to claim 5, wherein the switching requirement is satisfied based on the first duty ratio calculated by the second calculator having reached a second prescribed duty ratio, the first prescribed duty ratio being smaller than the second prescribed duty ratio.

9. The electric power tool according to claim 3, wherein the switching requirement is satisfied based on a first prescribed time period having elapsed since a measurement start timing, and the measurement start timing arrives based on a drive requirement to drive the motor being satisfied.

10. The electric power tool according to claim 4, wherein the requirement setter is configured to calculate a first prescribed time period based on the magnitude of the power-supply voltage detected by the voltage detector, the switching requirement is satisfied based on the first prescribed time period having elapsed since a measurement start timing, the measurement start timing arrives based on a drive requirement to drive the motor being satisfied.

11. The electric power tool according to claim 10, wherein the requirement setter is configured to shorten the first prescribed time period as the power-supply voltage detected by the voltage detector increases.

12. The electric power tool according to claim 9, further comprising:

a manual switch configured to be manually moved by a user of the electric power tool, wherein the drive requirement is satisfied based on the manual switch being manually moved by the user.

13. The electric power tool according to claim 9, wherein the switching requirement is satisfied based on a second prescribed time period having elapsed since the measurement start timing, the first prescribed time period being shorter than the second prescribed time period.

14. The electric power tool according to claim 3, further comprising:

a third calculator configured to calculate a first rate of increase and/or a second rate of increase in accordance with the magnitude of the power-supply voltage detected by the voltage detector, the first rate of increase corresponding to the rate of increase of the first duty ratio from the initial value, the second rate of increase corresponding to the rate of increase of the first duty ratio after the switching requirement is satisfied, the second rate of increase being lower than the first rate of increase.

15. The electric power tool according to claim 14, wherein the third calculator is configured to decrease the first rate of increase and/or the second rate of increase as the power-supply voltage detected by the voltage detector increases.

16. The electric power tool according to claim 2, wherein the voltage detector is configured to detect the magnitude of the power-supply voltage before the motor is driven by the drive circuit.

17. The electric power tool according to claim 16, wherein the voltage detector is configured to detect the magnitude of the power-supply voltage (i) after a drive requirement is satisfied and (ii) before the motor is driven by the drive circuit, the drive requirement being required for driving the motor.

18. The electric power tool according to claim 2, further comprising:

a drive signal generator configured to output the drive signal to the drive circuit, the drive signal having the first duty ratio calculated by the second calculator.

19. An electric power tool comprising:

a motor;

a drive circuit configured to receive a power-supply voltage and a drive signal, the drive signal being in the form of a pulse-width modulation signal having a first duty ratio, the drive circuit being configured to apply the power-supply voltage to the motor in accordance with the first duty ratio to drive the motor;

a voltage detector configured to detect a magnitude of the power-supply voltage;

a first calculator configured to calculate a desired duty ratio based on the magnitude of the power-supply voltage detected by the voltage detector, the desired duty ratio being required to rotate the motor at a specific desired rotational speed; and a second calculator configured to increase the first duty ratio from a specific initial value to the desired duty ratio along a first profile to thereby cause a rotational speed of the motor to reach the desired rotational speed along a first speed trajectory, the first profile being based on the magnitude of the power-supply voltage detected by the voltage detector.

20. A method for controlling a motor in an electric power tool, the method comprising:

calculating a desired value of a duty ratio based on a magnitude of the power-supply voltage, the desired value being required to rotate the motor at a specific desired rotational speed;

increasing the duty ratio from a specific initial value to the desired value in accordance with a lapse of time;

varying a rate of increase of the duty ratio based on the magnitude of the power-supply voltage; and applying the power-supply voltage to the motor in accordance with the duty ratio to thereby drive the motor.

* * * * *